United States Patent
Kurian

(10) Patent No.: US 10,157,383 B2
(45) Date of Patent: Dec. 18, 2018

(54) ORGANIC LIGHT EMITTING DIODE ("OLED") VISUAL AUTHENTICATION CIRCUIT BOARD

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/028,108

(22) Filed: Jul. 5, 2018

(65) Prior Publication Data

US 2018/0322498 A1 Nov. 8, 2018

Related U.S. Application Data

(63) Continuation of application No. 15/251,017, filed on Aug. 30, 2016, now Pat. No. 10,043,183.

(51) Int. Cl.
*G06Q 20/40* (2012.01)
*G06Q 20/34* (2012.01)
(Continued)

(52) U.S. Cl.
CPC ....... *G06Q 20/4014* (2013.01); *G06Q 20/341* (2013.01); *G06Q 20/3552* (2013.01); *G06Q 20/4018* (2013.01); *G07F 7/0846* (2013.01); *G07F 7/1008* (2013.01); *G09G 3/3208* (2013.01); *G09G 5/26* (2013.01); *G09G 2320/0666* (2013.01); *G09G 2330/02* (2013.01);
(Continued)

(58) Field of Classification Search
CPC .... G09G 3/34; G06C 20/352; G06C 20/4093; G07F 7/0846
See application file for complete search history.

(56) References Cited

U.S. PATENT DOCUMENTS

| | | | |
|---|---|---|---|
| 2,912,066 A | 11/1959 | Ellithorpe | |
| 3,703,864 A | 11/1972 | Bradford | |

(Continued)

FOREIGN PATENT DOCUMENTS

| | | |
|---|---|---|
| DE | 102009028991 | 8/2009 |
| EP | 0827066 | 7/1997 |
| WO | WO2013131153 | 4/2012 |

OTHER PUBLICATIONS

Conor Gaffey, "World's Smallest Nano Chip will Double Processing Power of Smartphones," Jun. 9, 2015,
(Continued)

*Primary Examiner* — Phi Hoang
(74) *Attorney, Agent, or Firm* — Weiss & Arons LLP; Michael A. Springs, Esq.

(57) ABSTRACT

A circuit board that includes OLED display technology is provided. An OLED display may present light patterns recognizable by a hearing or visually impaired users. The light pattern may be customized by the user. A specific workflow may be associated with a specific light pattern. A light pattern may visually guide a user through a workflow. For example, different menu options may be color coded. High consequence changes may flash with a certain light sequence or pattern. Trusted devices may present a specific light pattern or matrix at "login" time to confirm that the user is accessing a trusted device.

20 Claims, 19 Drawing Sheets

(51) Int. Cl.
　　*G07F 7/08*　　(2006.01)
　　*G09G 5/26*　　(2006.01)
　　*G09G 3/3208*　　(2016.01)
　　*G07F 7/10*　　(2006.01)

(52) U.S. Cl.
　　CPC ... *G09G 2340/045* (2013.01); *G09G 2354/00* (2013.01); *G09G 2358/00* (2013.01); *G09G 2370/16* (2013.01)

(56) References Cited

U.S. PATENT DOCUMENTS

| | | | |
|---|---|---|---|
| 3,946,206 | A | 3/1976 | Darjany |
| 4,372,225 | A | 2/1983 | Tissot et al. |
| 4,557,352 | A | 12/1985 | Tschappat, Jr. |
| 4,953,326 | A | 9/1990 | Wexler et al. |
| 4,968,873 | A | 11/1990 | Dethloff et al. |
| 5,168,354 | A | 12/1992 | Martinez et al. |
| 5,313,051 | A | 5/1994 | Brigida et al. |
| 5,539,819 | A * | 7/1996 | Sonoyama ......... G06K 19/0704 379/354 |
| 5,693,956 | A | 12/1997 | Shi et al. |
| 5,734,154 | A | 3/1998 | Jachimowicz et al. |
| 5,770,849 | A | 6/1998 | Novis et al. |
| 5,970,888 | A | 10/1999 | Sheppard |
| 6,015,092 | A | 1/2000 | Postlewaite et al. |
| 6,057,646 | A | 5/2000 | Pieroth et al. |
| 6,173,899 | B1 | 1/2001 | Rozin |
| 6,394,343 | B1 | 5/2002 | Berg et al. |
| 6,724,103 | B2 | 4/2004 | Parrault |
| 7,025,277 | B2 | 4/2006 | Forrest et al. |
| 7,270,276 | B2 | 9/2007 | Vayssiere |
| 7,357,315 | B2 | 4/2008 | Vergara et al. |
| 7,360,682 | B2 | 4/2008 | Shane et al. |
| 7,360,691 | B2 | 4/2008 | Takayama |
| 7,523,856 | B2 | 4/2009 | Block et al. |
| 7,588,183 | B2 | 9/2009 | Shane et al. |
| 7,791,559 | B2 | 9/2010 | Piasecki |
| 7,814,016 | B2 | 10/2010 | Pranger |
| 7,856,116 | B2 | 12/2010 | Rodriguez et al. |
| 7,940,159 | B2 | 5/2011 | Clemens et al. |
| 7,992,789 | B2 | 8/2011 | Borracci |
| 8,237,068 | B2 | 8/2012 | Szaikowski |
| 8,276,823 | B2 | 10/2012 | Chen |
| 8,282,007 | B1 * | 10/2012 | Cloutier ........... G06K 19/06196 235/488 |
| 8,317,094 | B2 | 11/2012 | Lehman |
| 8,378,932 | B2 | 2/2013 | Fein et al. |
| 8,392,965 | B2 | 3/2013 | Carter et al. |
| 8,413,893 | B2 | 4/2013 | Kim |
| 8,471,382 | B2 | 6/2013 | Muklashy et al. |
| 8,479,981 | B2 | 7/2013 | Carmichael et al. |
| 8,399,889 | B2 | 9/2013 | Wu et al. |
| 8,523,059 | B1 | 9/2013 | Mullen et al. |
| 8,540,151 | B1 | 9/2013 | Snyder et al. |
| 8,678,293 | B2 | 3/2014 | Chen |
| 8,756,680 | B2 | 6/2014 | Shashidhar |
| 8,810,816 | B2 | 8/2014 | Fischer et al. |
| 8,820,638 | B1 | 9/2014 | Cotter et al. |
| 9,250,657 | B2 | 2/2016 | Kim et al. |
| 9,470,404 | B2 | 10/2016 | Lee et al. |
| 9,491,879 | B2 * | 11/2016 | Cheng ................... H05K 7/06 |
| 9,538,127 | B2 | 1/2017 | Gish |
| 9,577,216 | B2 | 2/2017 | Fujino et al. |
| 10,056,048 | B2 | 8/2018 | Kim |
| 2001/0007332 | A1 | 7/2001 | Kjonaas et al. |
| 2003/0145205 | A1 | 7/2003 | Sarcanin |
| 2003/0208405 | A1 | 11/2003 | Putman et al. |
| 2005/0064936 | A1 | 3/2005 | Pryor |
| 2005/0102499 | A1 | 5/2005 | Kosuga et al. |
| 2005/0134461 | A1 | 6/2005 | Gelbman et al. |
| 2005/0173518 | A1 | 8/2005 | Takayama |
| 2005/0263590 | A1 | 12/2005 | Branck et al. |
| 2006/0016884 | A1 | 1/2006 | Block et al. |
| 2006/0091223 | A1 | 5/2006 | Zellner et al. |
| 2006/0131393 | A1 | 6/2006 | Cok et al. |
| 2006/0261174 | A1 | 11/2006 | Zellner et al. |
| 2006/0289629 | A1 | 12/2006 | Smith et al. |
| 2007/0115202 | A1 | 5/2007 | Kiesenhofer |
| 2007/0273507 | A1 | 11/2007 | Burchell et al. |
| 2007/0279315 | A1 | 12/2007 | Laves et al. |
| 2008/0035736 | A1 | 2/2008 | Tompkin et al. |
| 2008/0105751 | A1 | 5/2008 | Landau |
| 2008/0158150 | A1 | 7/2008 | Rossman et al. |
| 2009/0039154 | A1 | 2/2009 | Williams et al. |
| 2009/0278452 | A1 | 11/2009 | Kim |
| 2009/0314840 | A1 | 12/2009 | Granucci et al. |
| 2010/0084476 | A1 | 4/2010 | Zellner et al. |
| 2010/0260388 | A1 | 10/2010 | Garrett et al. |
| 2010/0302206 | A1 | 12/2010 | Yu et al. |
| 2011/0058113 | A1 | 3/2011 | Threlkel et al. |
| 2011/0060640 | A1 | 3/2011 | Thompson et al. |
| 2011/0140841 | A1 | 6/2011 | Bona et al. |
| 2011/0148944 | A1 | 6/2011 | Kobayashi |
| 2011/0164047 | A1 | 7/2011 | Pance |
| 2011/0178928 | A1 | 7/2011 | Carmichael et al. |
| 2011/0241996 | A1 | 10/2011 | Vesely |
| 2012/0019434 | A1 | 1/2012 | Kuhlman et al. |
| 2012/0280924 | A1 | 11/2012 | Kummer et al. |
| 2013/0162594 | A1 | 6/2013 | Paulsen et al. |
| 2013/0221112 | A1 | 8/2013 | Lai et al. |
| 2013/0232082 | A1 | 9/2013 | Krawczewicz et al. |
| 2013/0341394 | A1 | 12/2013 | Seo et al. |
| 2014/0007002 | A1 | 1/2014 | Chang et al. |
| 2014/0081729 | A1 | 3/2014 | Ocher |
| 2014/0093144 | A1 | 4/2014 | Feekes |
| 2014/0114861 | A1 | 4/2014 | Mages et al. |
| 2014/0118415 | A1 | 5/2014 | Seo |
| 2014/0172700 | A1 | 6/2014 | Teuwen et al. |
| 2014/0226275 | A1 | 8/2014 | Ko et al. |
| 2014/0267960 | A1 | 9/2014 | Ward |
| 2014/0291406 | A1 | 10/2014 | Ko |
| 2014/0337957 | A1 | 11/2014 | Feekes |
| 2014/0339315 | A1 | 11/2014 | Ko |
| 2014/0353384 | A1 | 12/2014 | Hoegerl et al. |
| 2014/0374494 | A1 | 12/2014 | Seo |
| 2015/0069126 | A1 | 3/2015 | Leon |
| 2015/0077646 | A1 | 3/2015 | Chen et al. |
| 2015/0179025 | A1 | 6/2015 | Cowell |
| 2015/0262052 | A1 | 9/2015 | Pahuja |
| 2016/0004945 | A1 | 1/2016 | Wade |
| 2016/0027391 | A1 | 1/2016 | Gibson et al. |
| 2016/0054479 | A1 | 2/2016 | Ho et al. |
| 2016/0085325 | A1 | 3/2016 | Lee et al. |
| 2016/0098709 | A1 | 4/2016 | Johnson et al. |
| 2016/0171461 | A1 | 6/2016 | Hoover et al. |
| 2016/0210453 | A1 | 7/2016 | Seo et al. |
| 2016/0224528 | A1 | 8/2016 | Trevarthen et al. |
| 2016/0254336 | A1 | 9/2016 | Zhang et al. |
| 2016/0307089 | A1 | 10/2016 | Wurmfeld et al. |
| 2017/0103718 | A1 | 4/2017 | Miller |
| 2017/0357979 | A1 | 12/2017 | Khurana et al. |

OTHER PUBLICATIONS http://www.us.schott.com/innovation/ultrathinglass, Retrieved on Sep. 14, 2016.

"Schott's Reliable and Strong Ultra-Thin Glass Features in Fingerprint Sensors in new Smartphones," Retrieved on Sep. 14, 2016.

Ron Martens, "The OLED Handbook, A Guide to OLED Technology, Industry & Market," 2015 Edition.

Bryce Kellogg, Vamsi Talla, Shyamnath Gollakota and Joshua R. Smith, "Passive Wi-Fi: Bringing Low Power to Wi-Fi Transmissions," Retrieved on May 11, 2016.

Ron Mertens, SecureCard—A New Secure Credit Card Technology, Utilizing an OLED Display, Nov. 21, 2006, Metalgrass Software.

John Wehr, "Card Size Specifications: When Does Card Size Matter?" Jan. 1, 2002.

Zachary Shahan, "Ultra-Thin-Solar-Cell Company Unstealths, Aims to Cut Cost of Solar Cells in Half!" Mar. 14, 2012, Sustainable Enterprises Media, Inc.

"ISO Magnetic Stripe Card Standards," Retrieved on Jul. 18, 2016.

(56) References Cited

OTHER PUBLICATIONS

"Coin Vs. Plastic: Which Credit Card Consolidation Tool is the Best?" Retrieved on Apr. 7, 2016, PayProTec.
"Tiny Batteries Could Revolutionize Green Energy," Retrieved on Apr. 5, 2016, National Geographic Society.
"Yubikey 4 & Yubikey 4 Nano," Retrieved on Apr. 7, 2016, Yubico.
"Magnetic Stripe Card Standards," Retrieved on Apr. 20, 2016, MagTek Inc., Seal Beach, California.
"A Power-Harvesting Pad-Less mm-sized 24/60GHz Passive Radio With On-Chip Antennas," Retrieved on Apr. 19, 2016, IEEE.
"Magnetic Stripe Card Recommendations," Retrieved on Apr. 20, 2016;.
"Plastic Card Manufacturing Including Magnetic Stripe Tapelaying," Retrieved on Apr. 20, 16 2016.
Paul Buckley, "Flexible OLED Displays Target Volume Production in 2015," Feb. 5, 2015.
"MAX2837-2.3GHz to 2.7GHz Wireless Broadband RF Transceiver," Retrieved on May 30, 2016, Maxim Integrated.
"Ultrathin Rechargeable Lithium Polymer Batteries from PowerSteam," Apr. 5, 2016, Lund Instrument Engineering, Inc.
Tom Abate, "Stanford Engineers Aim to Connect the World with Ant-Sized Radios," Sep. 9, 2014, Stanford University, Stanford California.
http://www.schott.com/advanced_optics/english/syn/advanced_optics/products/wafers-and-thin/glass/glass-wafer-and-substrates/ultra-thin-glass/index.html, Retrieved on May 30, 2016.
Jennifer Langston, "UW Engineers Achieve Wi-Fi at 10,000 Times Lower Power," Feb. 23, 2016.
Ron Mertens, "New All-In-One Credit Card Concept," Oct. 29, 2009, Metalgrass Software.
"Wi-Fi," Apr. 12, 2016, Wikimedia Foundation, Inc.
"Ant-Sized IoT Radio," Retrieved on Jul. 18, 2016.
Nick Pino, "Samsting's Latest OLED Can be a Mirror, a Window, or a TV," Jun. 11, 2015, Future US, Inc., San Francisco, California.
"Pneumatic Tube," Mar. 11, 2016, Wikimedia Foundation, Inc.
"New Virtual Tellers," Retrieved on Jun. 6, 2016, Frontier Bank.
Dario Borghirio, "High-Tech Light Shutter Could Help Turn Your Windows into LCD Displays," May 1, 2015, Gizmag.
L. Zhao et al. "Novel Method for Fabricating Flexible Active Matrix Organic Light Emitting Diode (AMOLED) Displays," Sep. 21, 2011, Hewlett-Packard Development Company, L.P.
Arnar Toor, "LG Unveils Flexible Plastic E-paper Display, Aims for European Launch Next Month," Mar. 29, 2012.
Martyn Williams, "Samsung LG Show Flexible OLED, E-Paper Screens," Nov. 10, 2010.
"Electronic Paper," Jun. 10, 2016, Wikimedia Foundation, Inc,.
"E Ink," Jun. 8, 2016, Wikimedia Foundation, Inc.
"Ink Technology: Electrophoretic Ink, Explained," Retrieved on Jun. 20, 2016, E Ink Holdings, Inc.
"Are Toeprints Unique, Like Fingerprints?" Retrieved on Jun. 23, 2016.
Sampath Srinivas, Dirk Balfanz, Eric Tiffany, Alexi Czeskis, "Univeral $2^{nd}$ Factor (U2F) Overview", May 14, 2016, FIDO Alliance.
"Sonavation Announces Fingerprint Imaging Through Smart Phone OLED Display," Feb. 22, 2016.
Dario Borghino, "Wearable Thermoelectric Generator Could Extend Your Smartwatch's Battery Life", Apr. 14, 2014, Gizmag.
"Inductive Charging", May 6, 2016, Wikimedia Foundation, Inc.
"Near Field Communication", Apr. 29, 2016, Wikimedia Foundation, Inc.
Sumi Das, "A Keyboard that Rises Up From Flat Touch Screens," Feb. 13, 2013.
Jessica Leber, "A Shape-Shifting Sinartphone Touch Screen," Dec. 3, 2012.
Matthew Frankel, "Could This Be the Bank of the Future?" Nov. 9, 2014.
"Contactless Payment," Jul. 27, 2016, Wikimedia Foundation, Inc.
Zhiquin Chen, "Java Card Technology for Smart Cards: Architecture and Programmer's Guide," pp. 11-14, Copyright 2000, Sun Microsystems, Inc. Palo Alto, California.

* cited by examiner

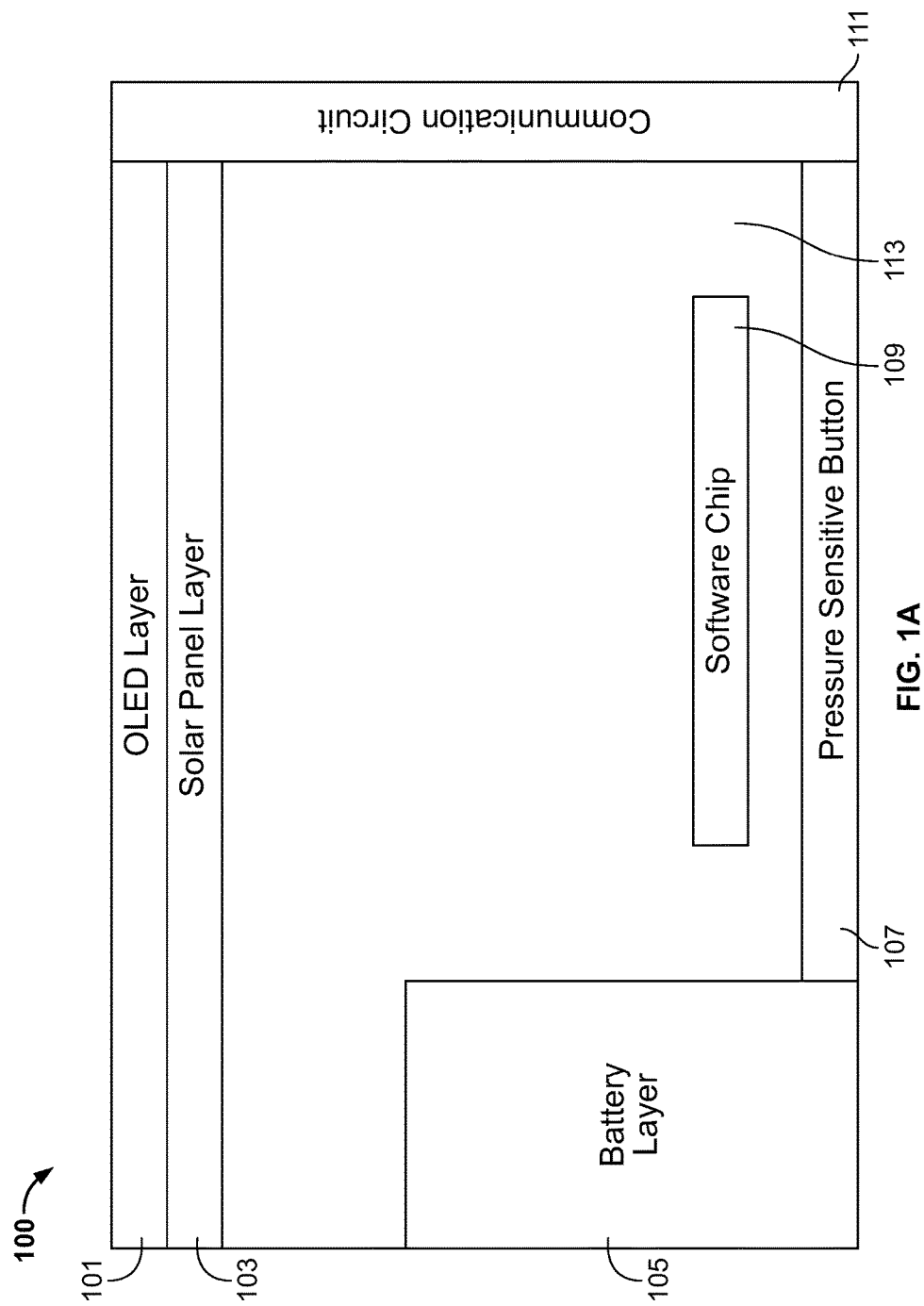

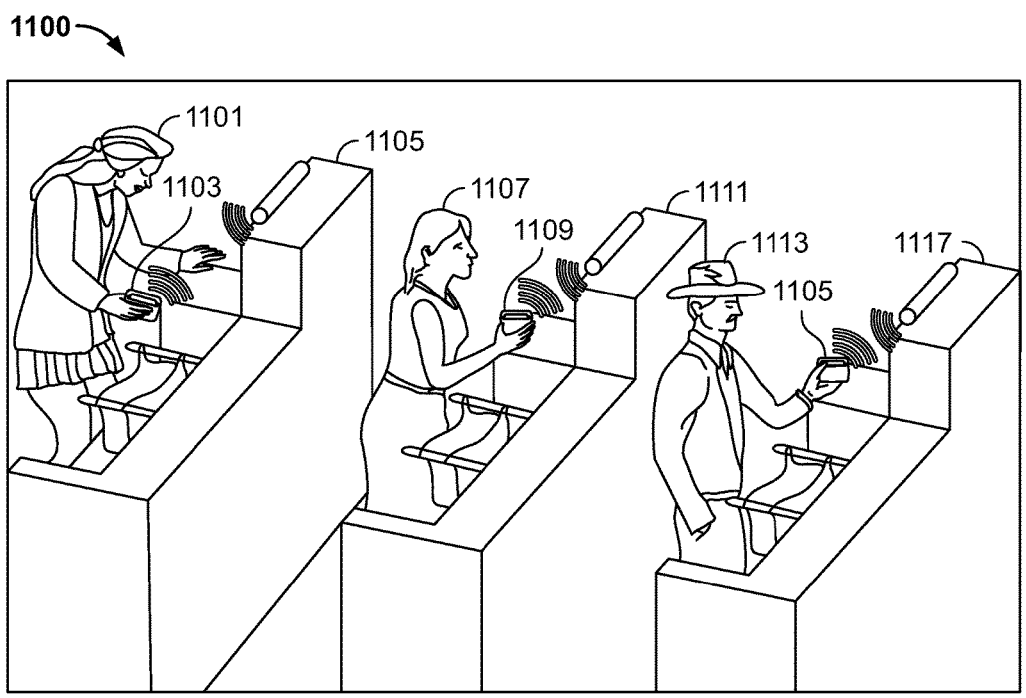
FIG. 11
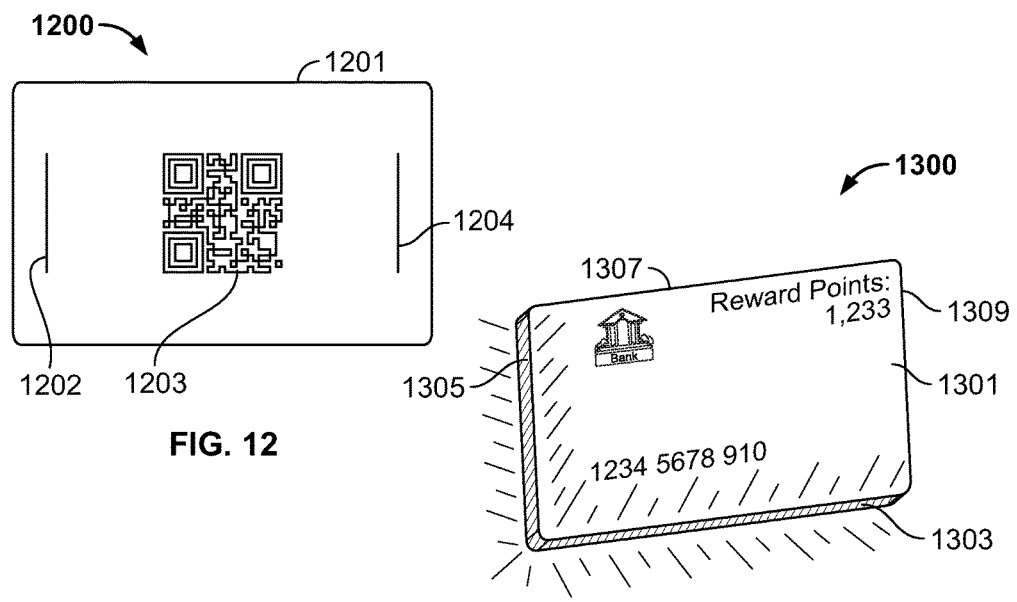
FIG. 12
FIG. 13

ORGANIC LIGHT EMITTING DIODE ("OLED") VISUAL AUTHENTICATION CIRCUIT BOARD

CROSS REFERENCE TO RELATED APPLICATION

This application is a continuation of U.S. patent application Ser. No. 15/251,017, filed on Aug. 30, 2016 and entitled "ORGANIC LIGHT EMITTING DIODE (" OLED") VISUAL AUTHENTICATION CIRCUIT BOARD" which is hereby incorporated by reference herein in its entirety.

FIELD OF TECHNOLOGY

Aspects of the invention relate to a circuit board for constructing a purchasing instrument that includes enhanced visual display features.

BACKGROUND

Consumer and business transactions may involve a transfer of sensitive data. Such sensitive data may include information typically associated with a check, credit card or debit card. Some transactions may require a user to input information and confirm the input information into a point-of-sale ("POS") terminal, automated teller machine ("ATM") or other kiosk.

A form factor typically associated with check or credit/debit cards is limited. For example, purchasing instruments such as credit or debit cards are typically 85.60 millimeters ("mm")×53.98 mm×0.8 mm. This limited form factor allows purchasing instruments to fit into a user's wallet or pocket.

However, the small size may present usability challenges for visually impaired users. For example, it may be difficult for visually impaired users to read information printed on a face of credit card or check. Additionally, given the small form factor, kiosks (e.g., POS terminal or ATM) that capture and display information associated with the credit card may also be of a relatively small form factor. Therefore, it may also be difficult for visually impaired users to read information presented by such kiosks.

Furthermore, sensitive data associated with a credit card is typically printed on a face (front or back) of the card. The sensitive data may include a unique card number, a user's name, an expiration date of the credit card number, a card verification value ("CVV") or any other suitable sensitive data.

The sensitive data may be visible to an onlooker who may obtain a copy (e.g., by taking a picture) of the sensitive data. The copied (and potentially compromised) sensitive data may then be used to initiate a fraudulent transaction.

Credit cards may also include sensitive data encoded on a magnetic stripe. The sensitive data encoded on the magnetic stripe is read when the card is "swiped" through a card reader. A person with malicious intent may utilize a skimming device to obtain a copy of the sensitive data encoded on the magnetic stripe. For example, a skimming device may be placed on or in an ATM's card reader.

A user may not notice that a skimmer or camera has been placed on or in an ATM because the skimmer/camera may not impede access to the ATM's card reader. Thus, the skimmer/camera may obtain a copy of the sensitive data encoded on a credit card's magnetic stripe in a manner that is transparent to the user.

In would be desirable to provide a purchasing instrument that more securely protects sensitive data. It would also be desirable to provide a purchasing instrument that is more "user-friendly" to visually impaired users.

However, as discussed above the relevant form factor associated with credit cards is limited. This form factor presents design challenges. For example, one design challenge involves the difficulty of attempting to include electronic features within the limited form factor. For example, to maintain this limited form factor, a purchasing instrument cannot be constructed using a relatively large power supply.

Accordingly, it would be desirable to leverage organic light emitting diode ("OLED") technology to enhance security and usability of credit cards and provide an OLED visual authentication circuit board.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1A shows illustrative apparatus in accordance with principles of the invention;

FIG. 11 shows an illustrative scenario and apparatus in accordance with principles of the invention;

FIG. 12 shows illustrative apparatus in accordance with principles of the invention;

FIG. 13 shows illustrative apparatus in accordance with principles of the invention;

DETAILED DESCRIPTION

Figure 1B:
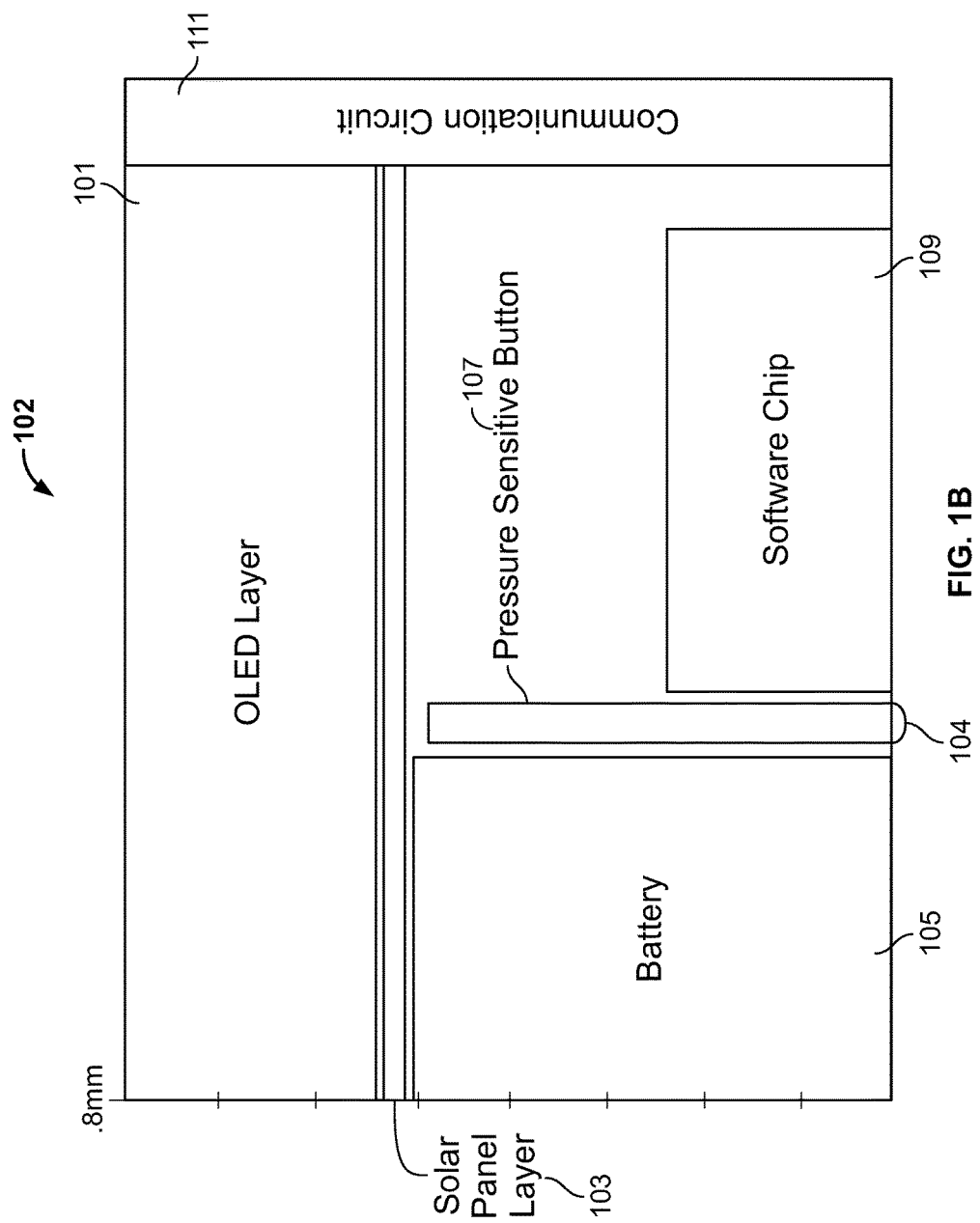
FIG. 1B shows illustrative apparatus in accordance with principles of the invention.

Aspects of the invention relate to a circuit board that utilizes OLED technology to enhance security and usability of a purchasing instrument. A purchasing instrument may include a credit card, debit card and/or other forms of payment. Such other forms of payment may include an instrument or device that includes a contactless chip, such as an ISO14443-compliant contactless chip, a smart phone, a tablet, a transponder or any other suitable electronic purchasing devices. Purchasing instruments may store sensitive data in a magnetic strip, a bar code, a silicon chip, nonvolatile computer readable media or any other suitable data storage device or format.

Suitable purchasing instruments may also conform to specifications published by the International Organization for Standardization. Illustrative specifications may include: ISO/IEC 7810, ISO/IEC 7811 and ISO/IEC 7816, which are hereby incorporated herein by reference in their respective entireties.

OLED display technology may enhance usability of credit-card-size circuit boards for visually impaired users. Credit cards and associated POS terminals typically present small-sized text that may be difficult to discern. OLED technology may be leveraged to provide a credit-card-size circuit board that present text or visual indicators that are more discernable than small-sized text typically associated with credit cards and POS terminals.

OLEDs include solid-state semiconductors constructed from a thin film of organic material. OLEDs emit light when electricity is applied across the thin film of organic material. Because OLEDs are constructed using organic materials, OLEDs may be safely disposed without excessive harm to the environment.

OLEDs may also be used to construct a display that is flexible. OLED displays may be folded, bent or rolled. An exemplary circuit board as described herein may be passed through a check reader that typically bends a paper check when reading the paper check. The OLED display may be configured to present information on a face of the circuit board such that the circuit board presents information that is formatted and positioned on the face of the circuit board as expected by check or credit card readers that typically read checks or credit cards.

Furthermore, OLEDs may be used to construct a display that consumes less power compared to other display technologies. For example, in a Liquid Crystal Display (hereinafter, "LCD") power must be supplied to the entire backlight to illuminate just one pixel in the display. In contrast, an OLED display does not require a backlight. Furthermore, in an OLED display, preferably, only the illuminated pixel draws power.

Therefore, power efficiency of OLED technology presents a possibility for designing circuit boards for electronic purchasing instruments and providing enhanced security and functionality for such purchasing instruments.

Apparatus and methods for a programmable circuit board are provided. The circuit board may be any suitable size. For example, the circuit board may not be greater than 86 mm×54 mm×0.8 mm. Dimensions of the circuit board may be based on dimensions of a paper check. For example, in the United States, personal paper checks are typically 6 inches ("in.")×2¾ in. An exemplary circuit board may be 6 in.×2¾ in.×0.8 mm.

The circuit board may include a programmable array of OLEDs. The OLEDs may form a display. The OLED display may be visible on a front face, back face and/or thickness of the circuit board. The OLED display may have a thickness that is not greater than 0.25 mm. The OLED display may cover some or all of a surface area of the circuit board. For example, the surface area may be 85.60 mm×53.98 mm. The OLED display may cover 10%, 30%, 50%, 75%, 90%, 100% or any suitable percentage of the of the surface area.

The circuit board may include a touch sensor. The touch sensor may be positioned above or below the OLED display. In some embodiments, the touch sensor may not greater than 0.001 mm thick.

The circuit board may include a communication circuit. The communication circuit may have a thickness that is not greater than 0.8 mm.

The circuit board may include a processor circuit. The processor circuit may alternatively be referred to herein as a software chip. The processor circuit may have a thickness that is not greater than 0.25 mm. The processor circuit may include a processor for controlling overall operation of the purchasing instrument and its associated components. The purchasing instrument may include RAM, ROM, an input/output ("I/O") module and a non-transitory or nonvolatile memory.

The I/O module may include a microphone, button and/or touch screen which may accept user provided input. The I/O module may include one or more of a speaker for providing audio output and a display for providing textual, audiovisual and/or graphical output. The display may include one or more OLEDs.

Software may be stored within the non-transitory memory and/or other storage media. The software may provide instructions to the processor for enabling the circuit board to perform various functions. For example, the non-transitory memory may store software used by the circuit board, such as an operating system, application programs, web browser and a database. Alternatively, some or all of computer executable instructions of the circuit board may be embodied in hardware or firmware components of the circuit board.

Application programs, which may be used by the circuit board, may include computer executable instructions for invoking user functionality related to communication, such as email, short message service ("SMS"), and voice input and speech recognition applications. Application programs may utilize one or more algorithms that securely store sensitive data, process received executable instructions, perform power management routines or other suitable tasks.

The circuit board may include a pressure sensitive button. The pressure sensitive button may have a thickness that is not greater than 0.8 mm. The pressure sensitive button may be actuated by a user to activate the circuit board. For example, actuating the pressure sensitive button may activate the processor or communication circuits.

In some embodiments, the circuit board may be activated in response to receiving high frequency wireless signals. The high frequency signals may provide power to one or more components (e.g., the communication circuit) of the circuit board. In response to receiving the power, the processor circuit may be activated and begin to draw power from a battery or other power source on the circuit board.

The circuit board may operate in a networked environment. The circuit board may support establishing network connections to one or more remote computers. Such remote computers may be nodes on a network. The nodes may be personal computers or servers that include many or all of the elements described above relative to the circuit board. The network connections may include a local area network ("LAN") and a wide area network ("WAN"), and may also include other networks. When used in a LAN networking environment, the circuit board may be connected to the LAN through a network interface or adapter. The communication circuit may include the network interface or adapter.

When used in a WAN networking environment, the circuit board may include a modem or other means for establishing communications over a WAN, such as the Internet. The communication circuit may include the modem.

It will be appreciated that the network connections shown are illustrative and other means of establishing a communications link between devices may be used. The existence of any of various well-known protocols such as TCP/IP, Ethernet, FTP, HTTP and the like is presumed, and the circuit board can be operated in a client-server configuration to permit a user to retrieve web pages from a web-based server. Web browsers can be used to display and manipulate data on web pages.

The circuit board and network nodes may include various other components, such as a battery, a speaker, and antennas (not shown). For example, network nodes may be portable devices such as a laptop, a tablet, a smartphone or any other suitable device for receiving, storing, transmitting and/or displaying relevant information.

The circuit board may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The circuit board may utilize computer-executable instructions, such as program modules, being executed by a computer. Generally, program modules include routines, programs, objects, components, data structures, etc. that perform particular tasks or implement particular abstract data types. The circuit board may be operational with distributed computing environments where tasks are performed by remote processing devices that are linked through a communications network. In a distributed computing environment, program modules may be located in both local and remote computer storage media including memory storage devices.

The circuit board may include a power source. The power source may provide power to other components of the circuit board. For example, the power source may power the OLED display, the communication circuit and the processor circuit. Illustrative power sources may include a battery. The battery may be rechargeable.

The power source may be a renewable power source. The power source may be flexible. The power source may include one or more batteries.

The power may include electromagnetic waves. For example, the circuit board's power source may include high frequency signals received from a node on a wireless network. The purchasing instrument may be configured to utilize received high frequency signals to recharge a battery or provide power to other components of the circuit board.

The power source of the purchasing instrument may include a solar panel. The power source of the purchasing instrument may include a thermoelectric generator. The thermoelectric generator may utilize body heat to generate electricity.

The power source may have any suitable thickness. For example, the power source may be not greater than 0.8 mm thick. The power source may not be greater than 0.5 mm thick.

In operation, the processor circuit may be configured to receive programming instructions from a user of the circuit board. The user may input the programming instructions using a touch sensitive OLED display of the circuit board. The programming instructions may include a light pattern designed by the user. The user may program the circuit board to present the light pattern on the OLED display in response to initiation, by the user, of a pre-determined workflow.

The predetermined workflow may include tasks typically performed by a purchasing instrument that includes the programmable circuit board. The tasks may be performed by communicating with one or more devices remote from the circuit board and executing executable instructions stored on the circuit board.

For example, the circuit board may be used to transfer funds between accounts of the user. The circuit board may present the light pattern when the user initiates a transfer of funds.

As a further example, the circuit board may be embedded in a credit-card-size purchasing instrument (e.g., credit or debit card). When the circuit board is used to make a purchase, the predetermined light pattern may be displayed on the circuit board. The predetermined light pattern may communicate to the user an amount of the purchase or whether the purchasing instrument is communicating with a known safe device or network.

As a further example, the circuit board may be used to wirelessly access a wireless beacon. A wireless beacon may include an ATM, POS terminal or any device with wireless communication capability. The processor circuit may receive a message from the communication circuit that the circuit board is within a pre-determined distance of a wireless beacon.

In response to detecting the presence of the wireless beacon, the circuit board may display the light pattern. The light pattern may convey to the user whether the wireless beacon is a known safe or trusted device.

The processor circuit may store the light pattern in non-transitory memory on the circuit board. The processor circuit may instruct the OLED display to self-illuminate in accordance with the light pattern. Such self-illumination may be triggered by initiation of a pre-determined workflow or other instructions executed by the processor circuit.

In response to detecting that the circuit board is within a pre-determined distance of a wireless beacon, the processor circuit may instruct the communication circuit to transmit instructions that dynamically program the wireless beacon. For example, the processor circuit may transmit instructions that program an ATM such that, in response to initiation of the pre-determined workflow at the ATM, the ATM display presents information to the user that conforms to the light pattern stored on the circuit board.

The circuit board may program devices accessed by the user such that the user is provided with a uniform experience across each of the accessed devices. A uniform experience may provide various functional advantages.

For example, users that are visually impaired may program the circuit board to store a light pattern that increases the font size of information displayed to the user. The circuit board may be configured to program other devices accessed by the user using the circuit board to present information to the user in a font size desired by the user.

For example, the light pattern may include executable instructions that, when executed by the processor circuit, instruct the OLED display to present information in a font size that is at least 14 point. "Point" is the vertical measurement of the lettering presented on electronic display. There are approximately 72 points in one inch. When the light pattern is transferred to the wireless beacon, the wireless beacon may be dynamically programmed to scale-up the font size based on one or more properties of a screen hardwired to the wireless beacon. As used herein, "dynamically" may include in substantially real time.

As a further example, a user may have difficulty differentiating between colors. About 10% of males in the U.S. population have some sort of color vision impairment. Such a user may program the circuit board to display information in greyscale or otherwise avoid displaying information in specific colors, such as green or red. The circuit board may dynamically program other devices accessed by the user to configure their respective displays to avoid presenting information in green or red colors or present information in greyscale.

The light pattern may include executable instructions that, when executed by the processor circuit, instruct the OLED display of the circuit board to present an approval indicator in a first shape and a rejection indicator in a second shape. For example, users that are visually impaired may have difficulty distinguishing between "yes" and "no" based on letters alone.

As a further example, when the circuit board is included in a purchasing instrument, the light pattern may configure the circuit board (or other device) to display the "yes" indicator using a triangular shape and the "no" indicator in a circular shapes. The shapes may be easier to distinguish than printed words.

The light pattern may include executable instructions that, when executed by the processor circuit, instruct the OLED display of the circuit board to present (1) a first approval indicator for a first transaction value in a first shape and in a first color and (2) a second approval indicator for a second transaction value in a second shape and in a second color. The colors may be any suitable colors. The shapes may be any suitable shapes. For example, a circular shape may correspond to "yes," the user wishes to proceed with a transaction. A square shape may correspond to "no," the user wishes to abort the transaction.

In some embodiments, shapes or colors may be used to emphasize to a user that a transaction is above a pre-determined threshold value. The pre-determined threshold value may be set by the user. The pre-determined threshold value may correspond to a default value.

Indicator shapes may be associated with different value ranges. For example, transaction associated with a value under "$x" may be shown using a first indicator (e.g., specific shape and/or color). Transaction associated with a value of "$2x" may be shown using a second indicator. The second indicator may flag to the user that the transaction is of a higher value. Flagging transactions above a threshold value allows the user to abort such transactions or confirm them.

A light pattern may include executable instructions. The executable instructions may dynamically program a device that receives the light pattern. For example, the light pattern may include instructions that program a wireless beacon such that a display of the wireless beacon mimics actions of the circuit board. As a further example, the light pattern may include instructions that program the beacon such that a device (e.g., display) hardwired to the wireless beacon presents information that conforms to the light pattern stored on the circuit board.

Thus, a user may program the circuit board with the light pattern and whenever the user initiates a workflow on a plurality of devices, each of the plurality of devices will display information the conforms to the light pattern. Dynamically programming each of the plurality of devices provides the user with a uniform and customized experience across the plurality of devices. The circuit board may be viewed as a "programmable key" that programs the each of the multiple devices to conform to the light pattern stored on the circuit board.

A user may program the circuit board with multiple light patterns. Each light pattern may be associated with one or more workflows. For example, the light pattern may be a first light pattern. The pre-determined workflow may be a first workflow. In operation, the processor circuit may be configured to be programmed with a second light pattern. The user may program the circuit board such that the second light pattern is presented in response to initiation, by the user, of a second pre-determined workflow.

The second light pattern may be different from the first light pattern. For example, the first and second light patterns may utilize different colors and/or shapes.

In some embodiments, a light pattern may be presented based on how frequently a workflow is initiated by the user. For example, the first light pattern may be associated with a workflow that is executed "x" number of times. The second workflow may be associated with a workflow that is executed "x/2" number of times. Infrequently executed workflows may be associated with specific sensitive datum or high values.

As a more specific example, a first light pattern may be presented when the user is prompted for credentials at a login screen of a wireless beacon. The first light pattern may indicate that the device requesting the credentials is a trusted device or that the circuit board is connected to a trusted network.

The parameters of "trust" may be defined by a system administrator. The communication circuit may be responsible for "dialing" home—e.g., contacting a trusted network directly or from a virtual private network—in order to get any updates or configuration changes—e.g., changes in the list of known-safe networks and/or "trust" parameters.

In some embodiments, the first light pattern may also indicate where the user should enter a "username" and where the user should enter a password. Such direction may be especially important for a visually impaired user.

Typically, a username is not obscured or otherwise hidden from view when entered by the user. Therefore, if a user where to mistakenly enter a password in the field for a username, the user's password would be visible to bystanders or a hidden camera focused on the login screen. A light pattern may reduce the risk that a user will make such a mistake. The light pattern may prompt the user for a username using a first shape and/or first color that is more easily discernable than words or letters. The light pattern may prompt the user for a password using a second shape and/or second color that is easily discernable from the first shape.

Furthermore, a specific light pattern may be presented after the user's credentials are authenticated. The light pattern may visually confirm that the user's credentials have been authenticated. The light pattern may visually confirm that the user's credentials have been entered at a trusted device or network.

Apparatus may include a programmable integrated circuit board. The circuit board may include a programmable array of OLEDs that forming an OLED display. The integrated circuit may include a communication circuit. The integrated circuit may include a processor circuit.

The processor circuit may communicate with a non-transitory memory. The processor may extract machine executable instructions stored on the non-transitory memory. The processor circuit may move the executable instructions to a transitory memory during execution of the instructions. The executable instructions may be executed by the processor.

The integrated circuit may include a power source. The power source may supply energy to illuminate the OLED display and operate the communication circuit and the processor circuit. In some embodiments, the power source may have a thickness that is not greater than 0.5 mm.

In operation, the processor circuit may be programmable by a user of the integrated circuit. The user may program the integrated circuit to display a light pattern created by the user. Programming instructions received from the user may be stored in the non-transitory memory.

The processor circuit may be programmed to allow the user to design the light pattern by touching the OLED display. For example, the user my select colors or shapes using a touch sensitive OLED display. The user may also program the integrated circuit to associate the light pattern with a pre-determined workflow.

For example, a pre-determined workflow may correspond to verifying that sensitive data associated with the integrated circuit is secure. Sensitive data may include a unique identifier associated with the integrated circuit and sensitive data associated with the integrated circuit. Sensitive data may include a credit/debit card number, an expiration date and a CVV code. Such sensitive data may be stored on the integrated circuit. The integrated circuit may present the light pattern created by the user on the OLED display in response to verifying that the sensitive data associated with the integrated circuit is secure.

Sensitive data may be determined to be secure if the data is not associated with a fraud alert or known data breach. Sensitive data may be determined to be insecure (or at risk of being compromised) if the location or device being accessed by the user has been associated with a fraud alert or known data breach.

The pre-determined workflow may include receiving a message from the communication circuit that the integrated circuit is within a pre-determined distance of a wireless beacon or other network node. In response to receiving the message, the processor circuit may determine whether the sensitive data associated with the integrated circuit is securely transferrable to the wireless beacon. To make such a determination, the integrated circuit may submit one or more queries to the wireless beacon. In some embodiments, the integrated circuit may forward responses received from the wireless beacon to a remote server for further analysis.

Determining whether the sensitive data is securely transferrable to the wireless beacon may include verifying that the wireless beacon is a trusted device or is connected to a trusted network.

In response to determining that the sensitive data associated with the integrated circuit is securely transferrable to the wireless beacon, the integrated circuit may dynamically program the wireless beacon to display a light pattern to the user before accepting the sensitive data from the integrated circuit. The light pattern may visually indicate to the user that the wireless beacon is a trusted device. After displaying the light pattern, the integrated circuit may transfer the sensitive data to the wireless beacon.

The light pattern may be a first light pattern. In operation, the processor circuit may be configured to instruct the OLED display to present information in accordance with a second light pattern. The second light pattern may be displayed in response to determining that sensitive data associated with the integrated circuit has been compromised or is at risk of being compromised.

The second light pattern may visually provide a warning to a user that sensitive data associated with the integrated circuit has been compromised or, is at risk of being compromised if transferred to the wireless beacon. The second light pattern may visually indicate that the user should discontinue use of the sensitive data. The second light pattern may visually indicate that the user should not access a wireless beacon.

When the communication circuit detects that the integrated circuit is within a pre-determined distance of a wireless beacon, the processor circuit may transfer a light pattern to the wireless beacon. The processor circuit may also dynamically program the wireless beacon to display the light pattern before the wireless beacon presents a login screen to the user.

The integrated circuit may also dynamically program the wireless beacon such that, in response to receiving a specific light pattern, the wireless beacon prompts the user to enter a new set of sensitive data. The processor circuit may dynamically program the wireless beacon such that the new set of sensitive data is transferred from the wireless beacon to the integrated circuit and stored thereon.

After the processor circuit receives a new set of sensitive data, the new set may replace the comprised set of sensitive data. Once stored on the integrated circuit, the processor circuit may periodically verify that the new set of sensitive data is secure. For example, the processor circuit may be programmed to verify a status of sensitive data stored on the integrated circuit before using the sensitive data to pay for a purchase or execute a transaction. In response to determining that the new set of sensitive data is secure, the processor circuit may instruct an OLED display to illuminate as directed by a light pattern.

Apparatus for an integrated circuit board is provided. The integrated circuit may include a programmable array of OLEDs that form an OLED display. The integrated circuit may include a communication circuit, a processor circuit, a non-tangible memory and a processor. The integrated circuit may include a battery or other power source for powering the components of the integrated circuit.

In operation, the processor circuit may be configured to receive a first light pattern programmed by a user of the integrated circuit. The integrated circuit may be programmed to present the first light pattern on the OLED display in response to initiation, by the user, of a pre-determined workflow. The first light pattern may be stored in non-transitory memory of the integrated circuit.

The processor circuit may instruct the OLED display to illuminate as directed by the first light pattern in response to initiation of the pre-determined workflow.

When the integrated circuit is within a pre-determined distance of a wireless beacon, the communication circuit may receive a message from the wireless beacon. In response to receiving the message, the integrated circuit may transfer the first light pattern to the wireless beacon. The integrated circuit may also dynamically program the wireless beacon such that in response to initiation of the pre-determined workflow at the wireless beacon, the wireless beacon requests that the integrated circuit transfer the first light pattern to the wireless beacon. After receiving the first light pattern, the wireless beacon may present information to the user as directed by the first light pattern.

The integrated circuit may receive a second light pattern programmed by the user. The user may utilize the wireless beacon to create the second light pattern. The user may program the second light pattern to be presented in response to initiation, by the user, of a pre-determined workflow.

The wireless beacon may transfer the second light pattern to the integrated circuit. In response to receiving the second light pattern from the wireless beacon, the processor circuit may delete the first light pattern and store the second light pattern in the non-transitory memory on the integrated circuit.

In response to receiving the second pattern from the wireless beacon, the processor circuit may adapt the second light pattern (programmed using the wireless beacon) for presentation on the OLED display of the integrated circuit. For example, the processor circuit may be programmed to scale the second light pattern such that it is displayed in a manner that is appropriate for the size of the OLED display. In some embodiments, the user may specify that no scaling occur.

In some embodiments, the wireless beacon may be configured to present to the user an instance of the second light pattern, scaled for presentation on the OLED display of the integrated circuit. The scaled instance of the second light pattern may be displayed to the user before transferring the second light pattern to the integrated circuit. The user may be able to "preview" how the second light pattern will look when presented on the OLED display of the integrated circuit.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative side view of circuit board 100. Circuit board 100 includes OLED layer 101. OLED layer 101 may form a rollable, thin OLED display with relatively lower power consumption than other display technology.

Circuit board 100 may include a touch sensor (not shown). The touch sensor may enable the circuit board to be responsive to user selections made by touching information displayed by OLED layer 101. In some embodiments, the touch sensor may not greater than 0.001 mm thick. The touch sensor may be embedded within OLED layer 101. Integrating the touch sensor into the OLED layer 101 may reduce reflectivity due to any space between the touch sensor and OLED layer 101. Reducing reflectivity may increase visibility of information presented using OLED layer 101.

A user may program a light pattern by touching information displayed by OLED layer 101 or by using a finger to draw a pattern on OLED layer 101.

Using OLED layer 101 to display information may provide several technical advantages. OLED displays typically have lower power consumption, wider viewing angles, better colors, higher contrast, operate in a wider temperature ranges and enable faster refresh rates than other display technology. In some embodiments, OLED displays may be fabricated directly on control circuitry. OLED displays may only include trace amounts of heavy metals. Thus, when disposed of, OLED display may be less harmful to the environment than other display technology.

Circuit board 100 includes solar panel layer 103. Solar panel 103 may be a power source for components of circuit board 100. OLED displays may be transparent when not illuminated. Thus, when OLED layer 101 is not illuminated, OLED layer 101 may be transparent. Sunlight may pass through OLED layer 101 and reach solar panel layer 103. Solar panel layer 103 may convert solar energy into electricity that powers one or more components of circuit board 100. Solar panel layer 103 may be thin enough to be flexible. In some embodiments, a solar layer may be positioned on a surface of circuit board 100 that is not covered by an OLED layer.

Circuit board 100 includes battery 105. Battery 105 may be rechargeable. Battery 105 may be flexible. Battery 105 may be recharged by power generated by solar panel layer 103. Battery 105 may be rechargeable from a power source external to circuit board 100.

Circuit board 100 includes software chip 109. Software chip 109 may control overall operation of circuit board 100 and its associated components. Software chip 109 may include the processor circuit. Software chip 109 may include a non-transitory memory. Circuit board 100 may include transitory and non-transitory memory locations (not shown) within thickness 113. Software chip 109 may access such memory locations. The memory locations may store instructions, that when executed by software chip 109, cause circuit board 100 to perform various functions.

For example, memory locations may store software used by circuit board 100, such as an operating system, application programs and an associated database.

Circuit board 100 includes communication chip 111. Communication chip 111 may be a communication circuit. Communication chip 111 may provide circuit board 100 with wireless communication functionality. Communication chip 111 may enable circuit board 100 to communicate using a variety of communication protocols including, Wi-Fi, Bluetooth, Ethernet, NFC and cellular telecommunications.

Circuit board 100 also includes pressure sensitive button 107. Pressure sensitive button 107 may be mechanically actuated. Actuation of pressure sensitive button 107 may provide an electronic signal to software chip 109 or any other component of circuit board 100.

For example, mechanical actuation of pressure sensitive button 107 may power-on and/or power-off software chip 109. Mechanical actuation of pressure sensitive button 107 may inform software chip 109 of a user's selection of choices displayed using OLED layer 101.

FIG. 1 shows illustrative components 101-113 of circuit board 100 in an arrangement within a thickness of circuit board 100. The arrangement shown in FIG. 1 is illustrative. Circuit board 100 may include additional components not shown in FIG. 1, such as a biometric sensor. For example, pressure sensitive button 107 may include a fingerprint reader that captures a user's fingerprint when button 107 is actuated.

One or more of components 101-113, and any additional components, may be arranged within circuit board 100 in any suitable fashion. For example, pressure sensitive button may be located in space 113. OLED layer 101 and/or solar panel layer 103 may flex or bend to allow a user to mechanically actuate pressure sensitive button 107.

Some embodiments may not include all of components 101-113. For example, a circuit board may not include solar panel layer 103 or pressure sensitive button 107.

FIG. 1B shows illustrative view 102 of a circuit board having a thickness of 0.8 mm. View 102 shows illustrative thicknesses of components 101-111. View 102 shows that in some embodiments, pressure sensitive button 107 may include a portion 104 that protrudes from a surface of a circuit board. In some embodiments, pressure sensitive button 107 may include a portion 104 that dips below a surface of the circuit board.

Figure 2:
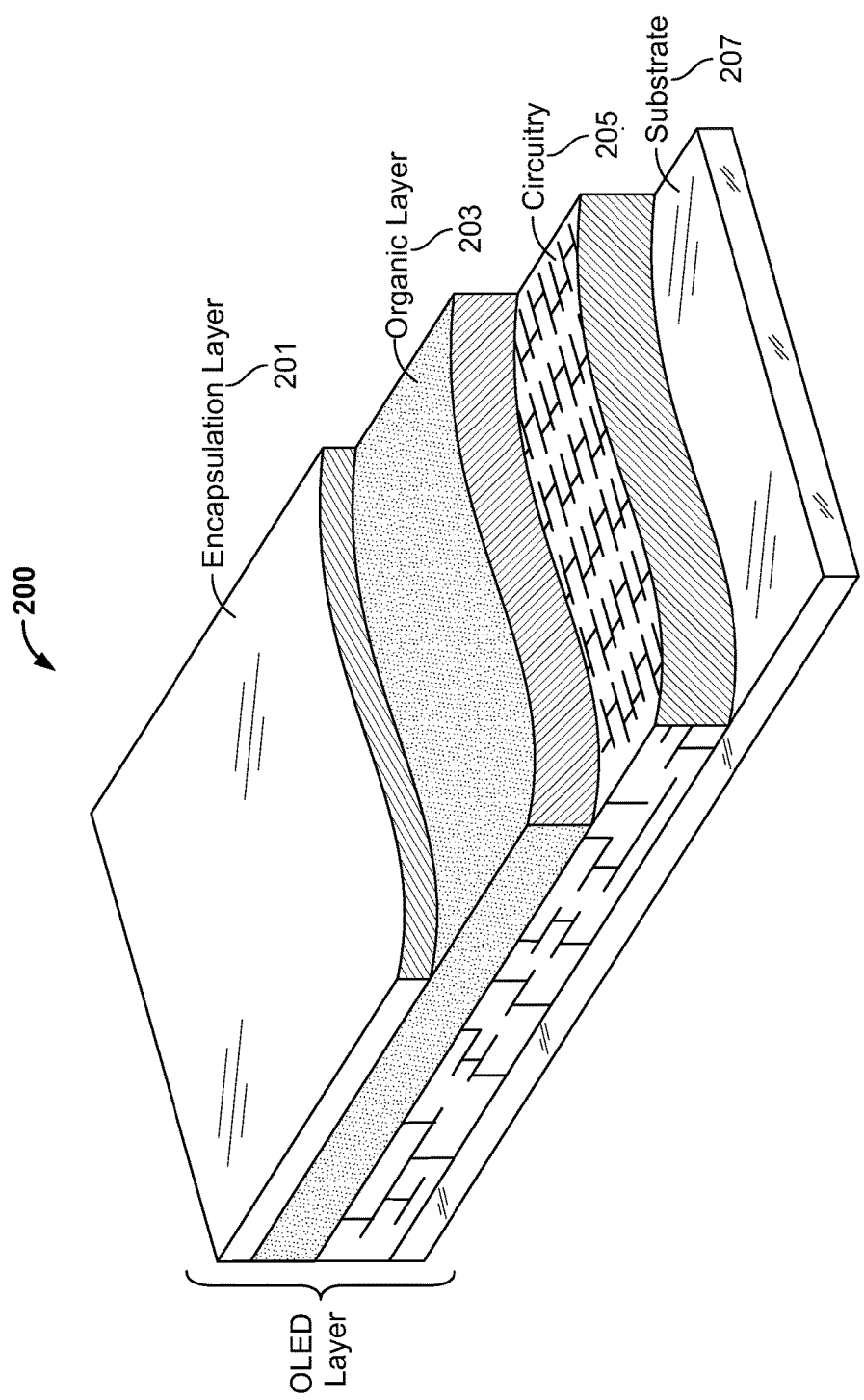
FIG. 2 shows illustrative apparatus in accordance with principles of the invention.

FIG. 2 shows structures 200 of an illustrative OLED layer, such as OLED layer 101 (shown in FIG. 1). Structures 200 include four layers: encapsulation layer 201, organic layer 203, circuitry layer 205 and substrate layer 207.

Encapsulation layer 201 protects the OLED layer from exposure to oxygen, water and other contaminants. Preferably, encapsulation layer 201 is flexible and transparent. Glass is an exemplary material that may be used to construct encapsulation layer 201. When glass is used to construct encapsulation layer 201, the glass may be very thin and flexible. For example, the glass may be between 50 micrometers ("µm") and 100 µm thick.

In some embodiments, encapsulation layer 201 may be constructed using thin-film encapsulation techniques such as Atomic Layer Deposition ("ALD"). ALD is a process that utilizes chemicals that, when deposited on a material, react to create a solid, thin film.

Structures 200 include organic layer 203. Organic layer 203 typically includes an emissive solid-state semiconductor. Organic layer 203 may be constructed from a thin film of organic (carbon-based) material. For example, organic layer 203 may include one or more OLEDs. When electricity is applied to an OLED within organic layer 203, electrons flow through organic layer 203 and release photons, thereby emitting light. Different types of emissive materials may be used. Each type of material may be associated with a different color light. An intensity of light emitted by organic layer 203 may be controlled by the amount of electricity flowing through organic layer 203.

Organic layer 203 may be doped with "host" materials. Host material may affect a property, such as power efficiency, of organic layer 203. For example, organic layer 203 may be doped with materials that improve its operation and/or achieve a desired color.

Organic layer 203 may include two or more sub-layers (not shown). For example, organic layer 203 may include 5, 10 or 15 sublayers. Illustrative sub-layers may include: (1) an electron transport layer, (2) a blocking layer, (3) an emissive layer, (4) a hole transport layer and (5) an injection layer.

An emissive layer may be placed between a cathode and an anode. When electricity is applied, electrons flow from the cathode to the anode. OLED displays may be driven by electrical current or voltage. In a preferred embodiment, the OLED display is driven by current. The cathode inserts electrons into the emissive layer, and the anode removes the electrons. Electron "flow" through the emissive layer releases photons, generating light. The color of the generated light may be changed by including different types of materials within the emissive layer.

A direction of light emitted by organic layer 203 may be controlled by a degree of transparency of the anode and/or cathode. In some embodiments, a cathode may be reflective. A reflective cathode may preferably be constructing using an aluminum based-compound or lithium fluoride. An anode may be transparent. A transparent anode may preferably be constructed using indium tin oxide. In such embodiments, when current flows between the cathode and anode, light is emitted through circuitry layer 205 and substrate layer 207. Circuitry layer 205 and substrate layer 207 may be transparent. Such embodiments may be referred to as "bottom-emitting OLEDs."

In some embodiments, the cathode may be transparent. A transparent cathode may preferably be constructed using indium tin oxide. The anode may be reflective. A reflective anode may direct light toward the transparent cathode. Such embodiments may be referred to as "top-emitting OLEDs." Typically, top-emitting designs are more efficient and are used to construct higher resolution OLED displays.

Additionally, top-emitting designs may allow organic layer 203 to be formed on a non-transparent substrate. Small-and medium-sized OLED displays (e.g., 1-7 inches) are typically constructed using top-emitting techniques.

Organic layer 203 may include one or more pixels. Different architectures are available for forming OLED pixels. One exemplary architecture includes positioning different color (e.g., red, green and blue) OLEDs adjacent to each other. Another exemplary architecture includes stacking different color OLEDs on top of each other. OLEDs may be stacked because materials used to construct organic layer 203 may be transparent. A stacked design may provide a smaller pixel size and higher resolution.

Structures 200 include circuitry layer 205. Circuitry layer 205 includes electronics that drive one or more pixels formed within organic layer 203. Preferably, amorphous silicon ("a-Si") and low temperature polysilicon ("LTPS") may be used to construct circuitry layer 205. In some embodiments, circuitry layer 205 may be transparent.

Substrate layer 207 supports circuitry layer 205, organic layer 203 and encapsulation layer 201. Substrate layer 201 may be constructed using various materials. For example, substrate layer 207 may be constructed using glass, plastic or metal materials. In some embodiments, such as in bottom-emitting OLEDs, substrate layer 207 may function as encapsulation layer 201.

Figure 3:
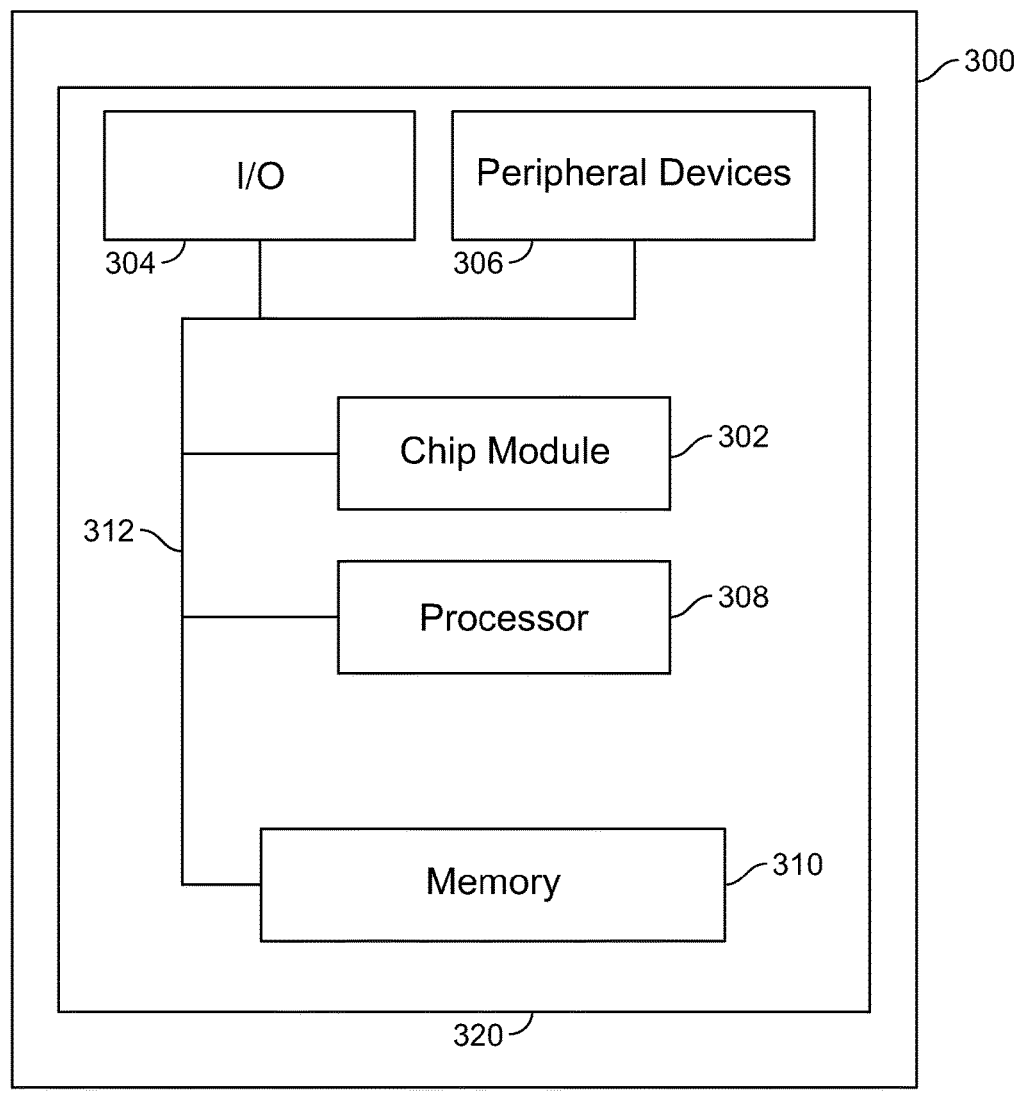
FIG. 3 shows illustrative apparatus in accordance with principles of the invention.

FIG. 3 shows illustrative software chip 300. Software chip 300 may include one or more features of software chip 109 (shown in FIG. 1). Software chip 300 may include chip module 302, which may include one or more integrated circuits, and which may include logic configured to perform any suitable logical operation.

Software chip 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable encoded media or devices; peripheral devices 306, which may include counter timers, real-time timers, power-on reset generators or any other suitable peripheral devices; logical processing device 308, which may compute data structural information, structural parameters of the data or perform logical operations; and machine-readable memory 310.

Machine-readable memory 310 may be configured to store, in machine-readable data structures: sensitive data, light patterns, a value, location information, transaction histories, electronic signatures of biometric features or any other suitable information or data structures.

Components 302, 304, 306, 308 and 310 may be coupled together by a system bus or other interconnections 312 and may be present on one or more circuit boards such as circuit board 320. In some embodiments, the components may be integrated into a single chip. The chip may be silicon-based.

FIGS. 4-9 show illustrative layers that may be present within an illustrative circuit board.

Figure 4:
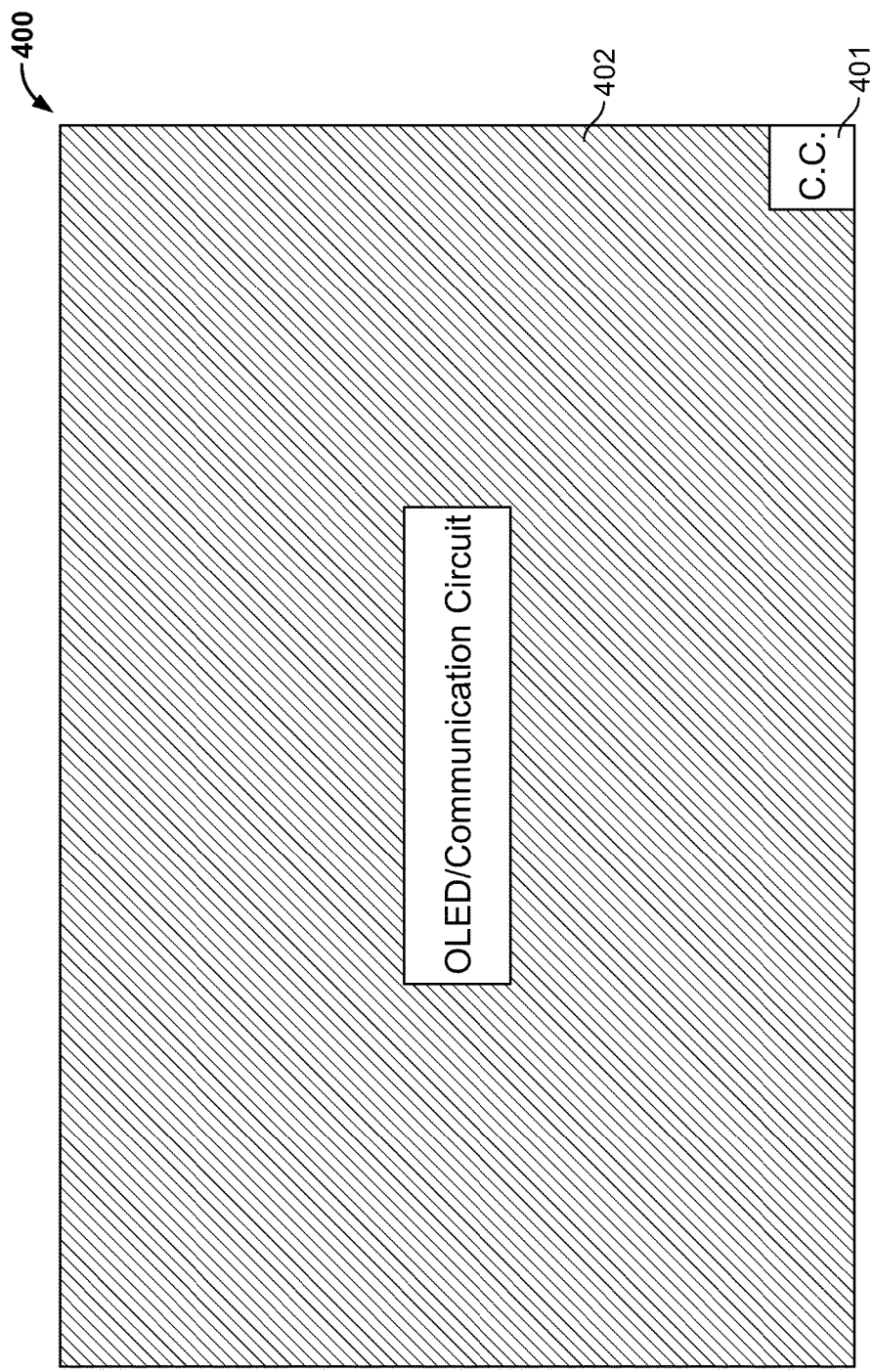
FIG. 4 shows illustrative apparatus in accordance with principles of the invention.

FIG. 4 shows illustrative layer 402. Layer 402 includes OLED layer (such as OLED layer 200, shown in FIG. 2). FIG. 4 also shows that, in some embodiments, communication circuit 401 may penetrate layer 402.

Figure 5:
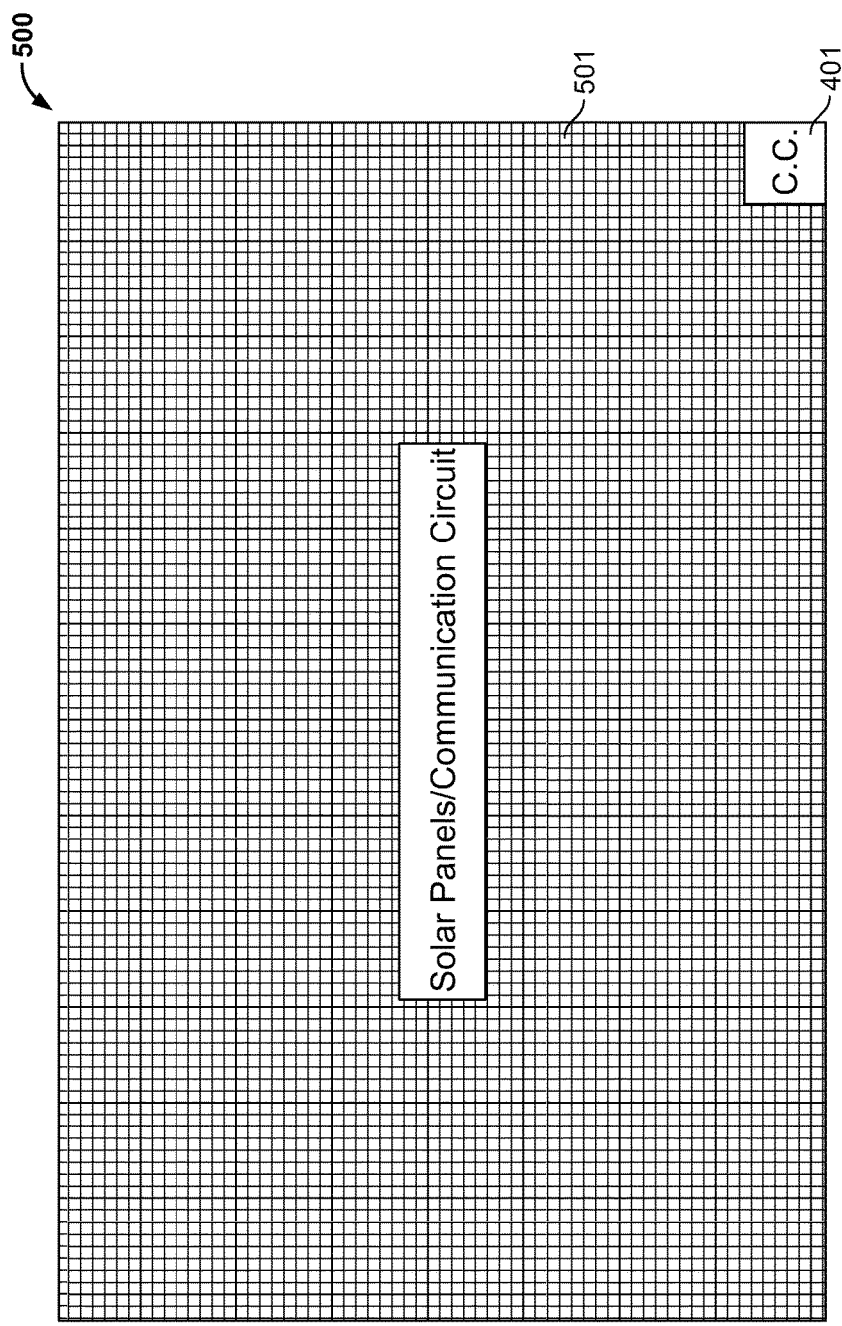
FIG. 5 shows illustrative apparatus in accordance with principles of the invention.

FIG. 5 shows illustrative layer 500. Layer 500 includes solar cells or panels 501 that may be used to power various components of a circuit board (e.g., circuitry layer 205, shown in FIG. 2). FIG. 5 also shows that, in some embodiments, communication circuit 401 may penetrate layer 500.

Figure 6:
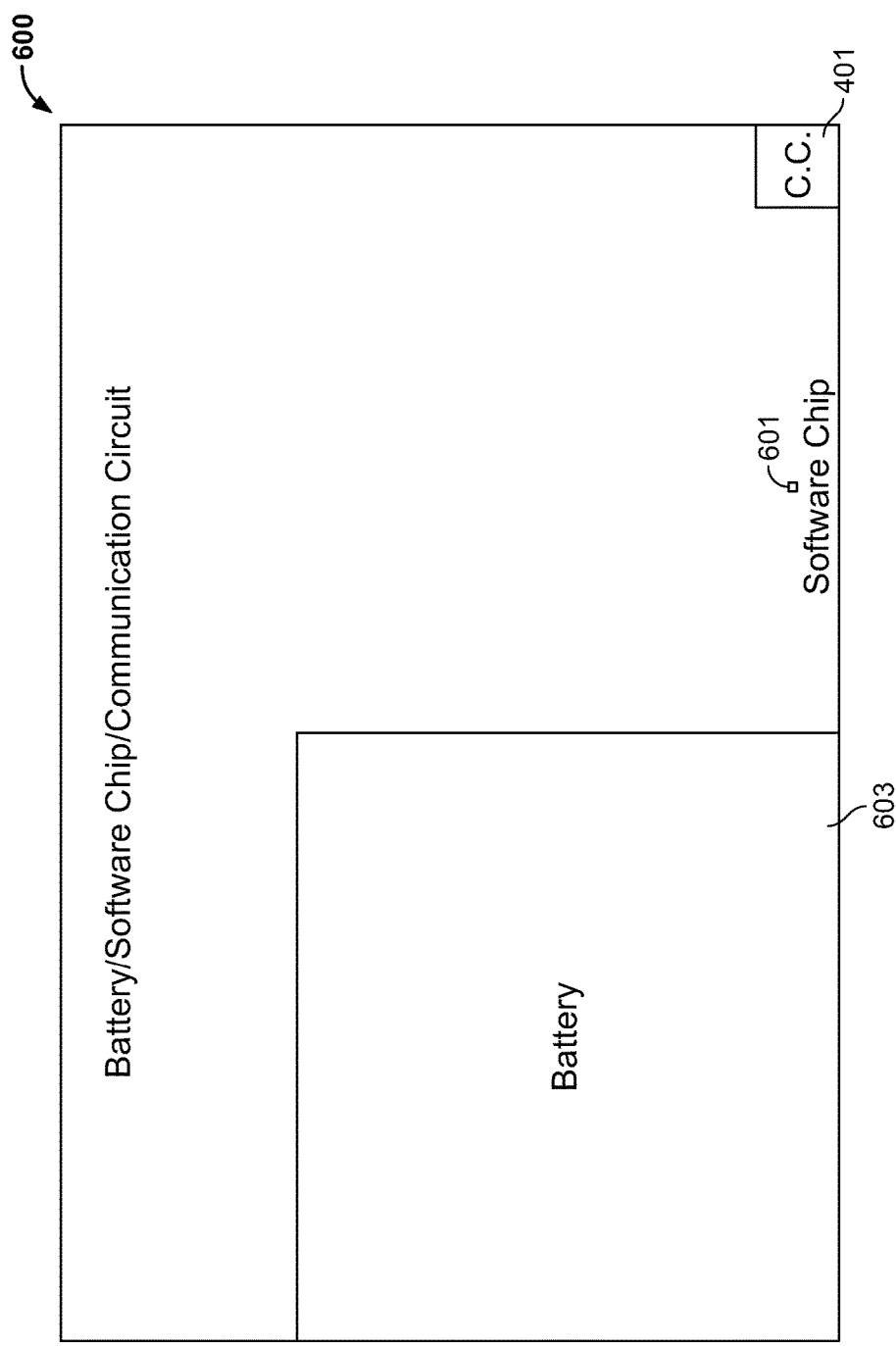
FIG. 6 shows illustrative apparatus in accordance with principles of the invention.

FIG. 6 shows illustrative layer 600. Layer 600 includes software chip 601. Software chip 601 may include one or more features of software chip 109 (shown in FIG. 1). Layer 600 includes battery 603. Battery 603 may include one or more features of battery layer 105 (shown in FIG. 1). FIG. 6 shows that, in some embodiments, communication circuit 401 may penetrate layer 600.

Figure 7:
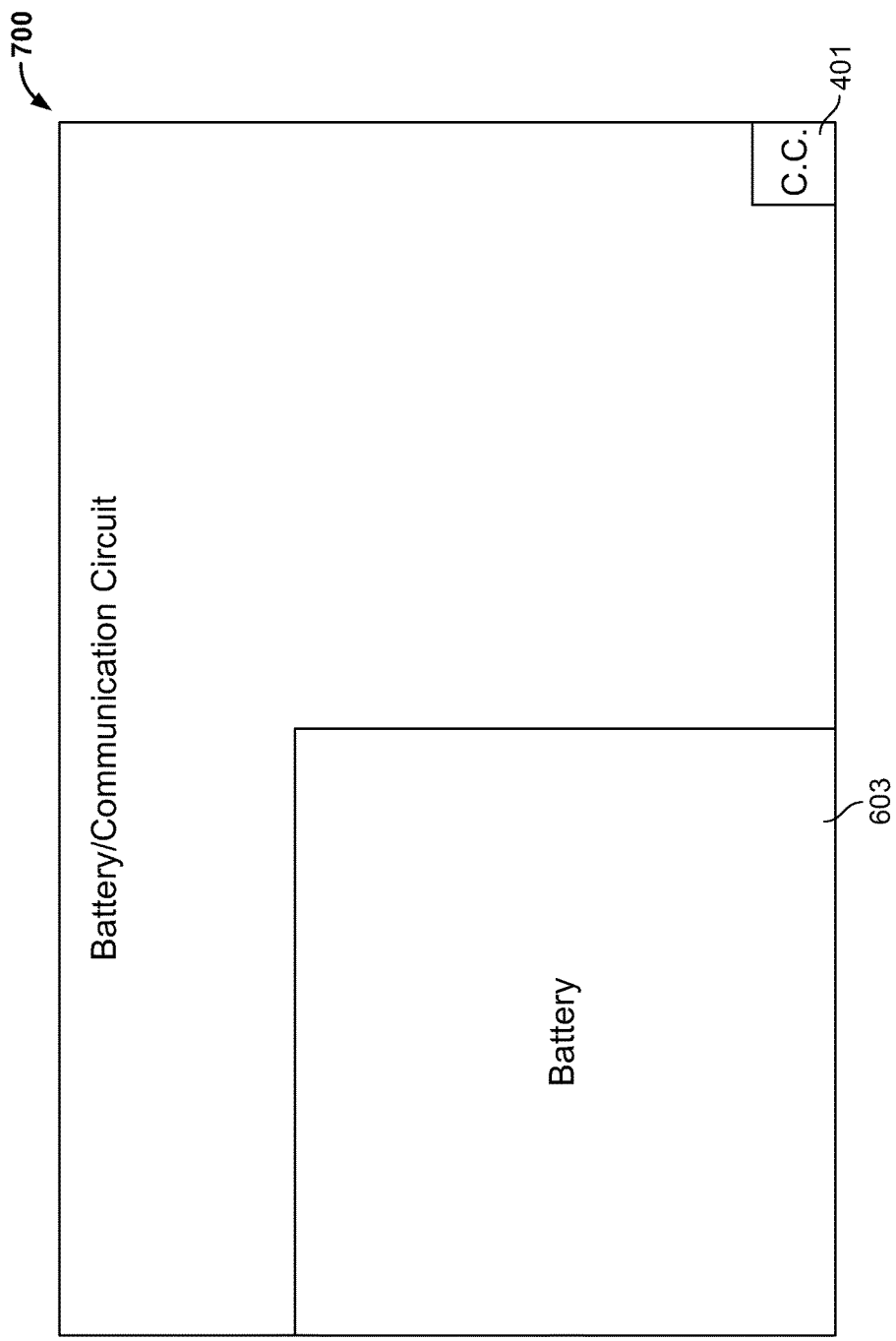
FIG. 7 shows illustrative apparatus in accordance with principles of the invention.

FIG. 7 shows illustrative layer 700. FIG. 7 shows that, in some embodiments, battery 603 may penetrate layer 700. FIG. 7 shows that, in some embodiments, communication circuit 401 may penetrate layer 700.

Figure 8:
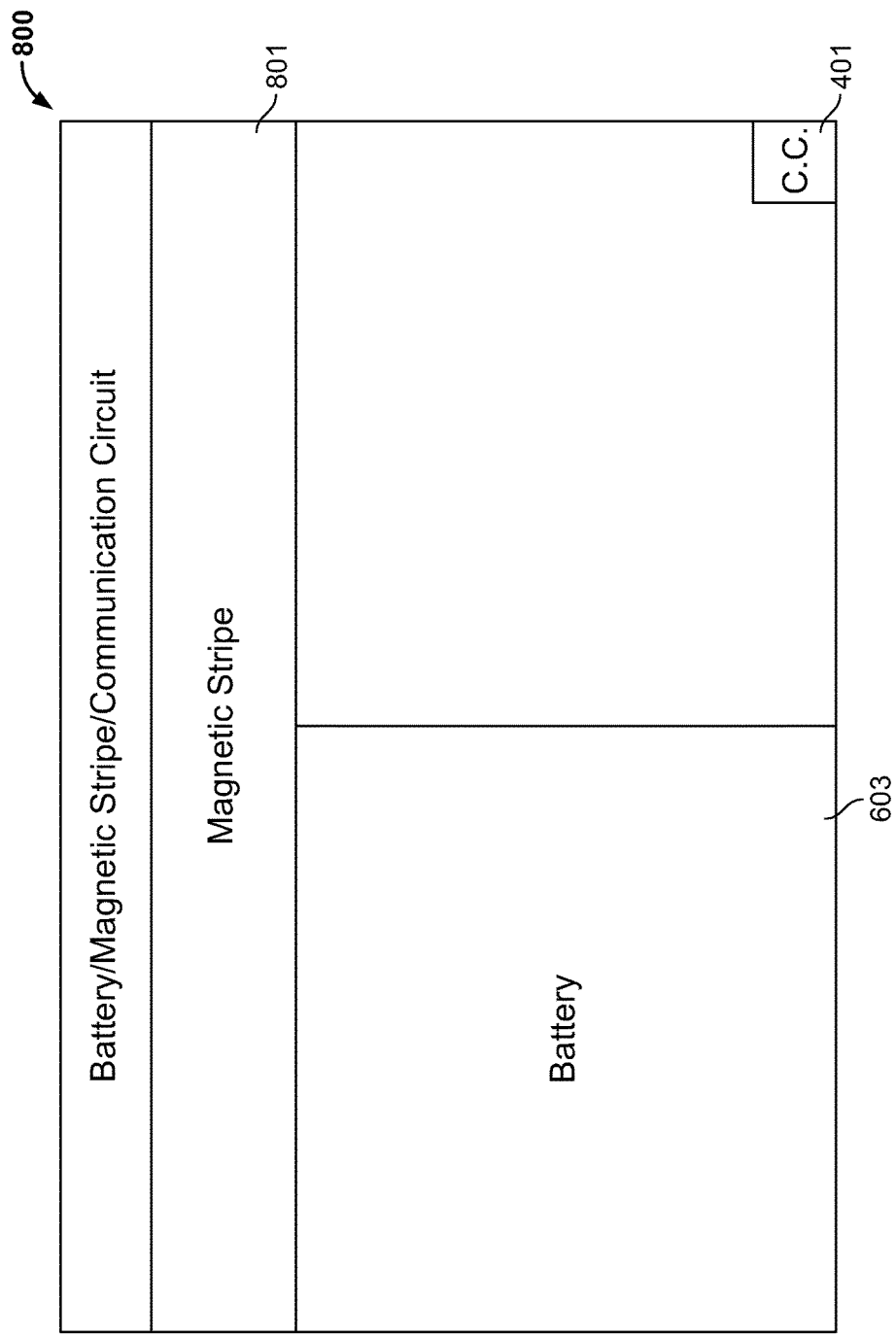
FIG. 8 shows illustrative apparatus in accordance with principles of the invention.

FIG. 8 shows illustrative layer 800. FIG. 8 shows that, in some embodiments, battery 603 may penetrate layer 800. FIG. 8 shows that, in some embodiments, communication circuit 401 may penetrate layer 800.

Layer 800 may include magnetic stripe 801. Magnetic stripe 801 may include magnetically encoded information. Magnetic stripe 801 may provide backwards compatibility for circuit boards described herein. In some embodiments, magnetic stripe 801 may be electronically linked to software chip 601 (shown in FIG. 6).

Software chip 601 may register each time magnetic stripe 801 is passed through a reader (not shown). Software chip 601 may instruct OLED layer 101 to present how many times, within a pre-determined time window, magnetic stripe 801 has been passed through the reader. Circuit board 101 may be programmed such that if magnetic stripe 801 has been passed through the reader more than a threshold number of times within the pre-determined time window, a specified light pattern may be presented on by OLED layer 101.

Figure 9:
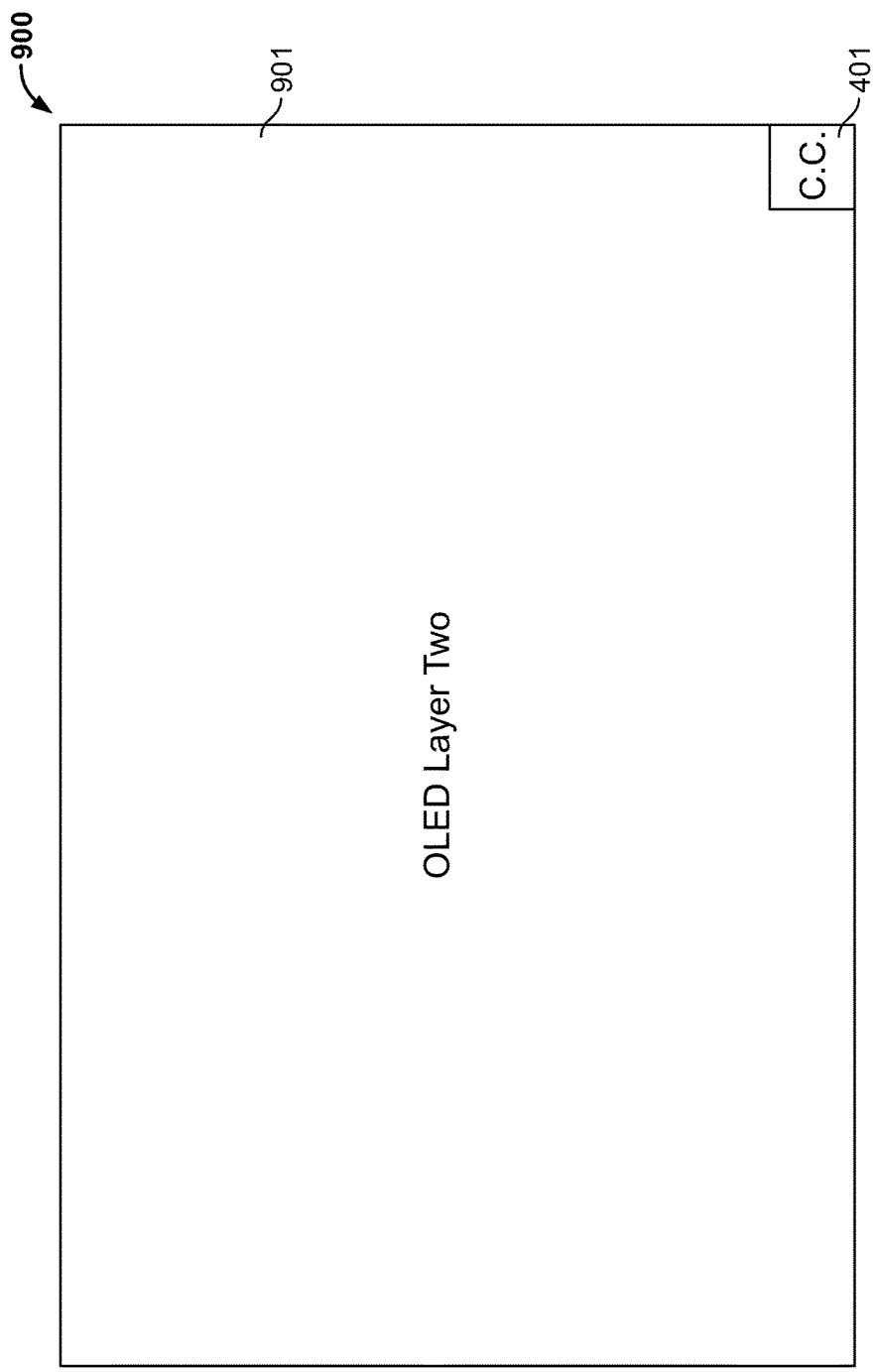
FIG. 9 shows illustrative apparatus in accordance with principles of the invention.

FIG. 9 shows illustrative layer 900. Layer 900 includes a second OLED layer 901. Second OLED layer 901 may include one or more features of OLED layer 200 (shown in FIG. 2). Second OLED layer 901 may allow front and back faces of a circuit board to include an OLED display. FIG. 9 also shows that communication circuit 401 may penetrate layer 900.

FIGS. 10A-10D show purchasing instrument 1000. Purchasing instrument 1000 may include a circuit board such as circuit board 100. Each of FIGS. 10A-10D is shaded differently to show that purchasing instrument 1000 may be illuminated in different colors or patterns. Purchasing instrument 1000 may store multiple instances of sensitive data. Each instance of sensitive data may correspond to a different purchasing instrument (e.g., credit cards, debit cards). In response to user selection, purchasing instrument 1000 may display at least a portion of the sensitive data associated with the purchasing instrument corresponding to the user selection.

Figure 10A:
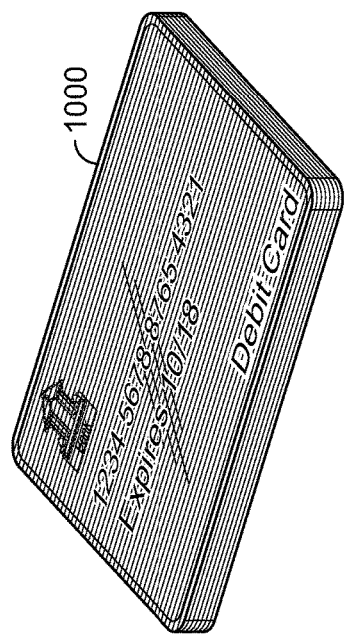
FIGS. 10A-10E show illustrative apparatus in accordance with principles of the invention.

For example, FIG. 10A shows that circuit board 100 may enable purchasing instrument 1000 to display information in a format associated with a typical debit card.

Figure 10B:
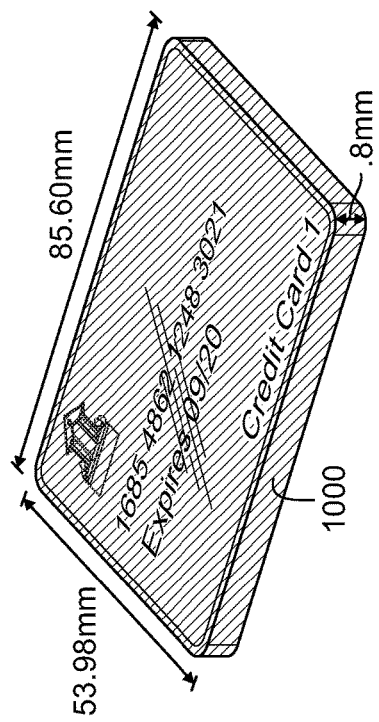

FIG. 10B shows that circuit board 100 may enable purchasing instrument 1000 to display information in a format associated with a typical credit card. FIG. 10B shows that purchasing instrument 1000 may have a length of 85.60 mm. FIG. 10B shows that purchasing instrument 1000 may have a width of 53.98 mm. FIG. 10B shows that purchasing instrument 1400 may have a thickness of 0.8 mm.

Purchasing instrument 1000 may provide visually ques to user. For example, in response to a user selection of sensitive data, the purchasing instrument may flash green if the selected sensitive data is secure. If the selected sensitive data has been compromised or has expired, the purchasing instrument may flash another color, such as red or yellow.

Figure 10C:
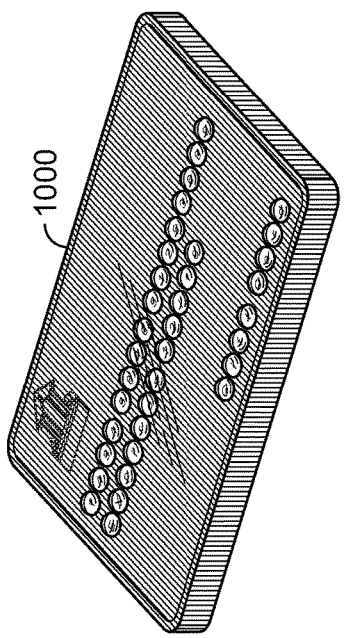

FIG. 10C shows that purchasing instrument 1000 may produce tangible "buttons" on what would otherwise be a smooth touch sensitive surface. An OLED display may present a visual indicator of what each button represents. A software chip such as software chip 109 (shown in FIG. 1) may control display of information presented so the information may be aligned with button shapes. A user may depress one or more buttons to enter information or make a selection.

For example, purchasing instrument 1000 may include a fluid-filled plastic panel (not shown) and associated reservoir (not shown). Because OLED displays may be transparent, information may be viewed through the fluid-filled panel. The fluid-filled panel and associated reservoir may be used to produce the tangible buttons on the surface of purchasing instrument 1000.

A purchasing instrument may include one or more button geometries. For example, illustrative button geometries may include a QWERTY layout, DVORAK layout, COLEMAK layout, a numeric keypad or any suitable layout.

Figure 10D:
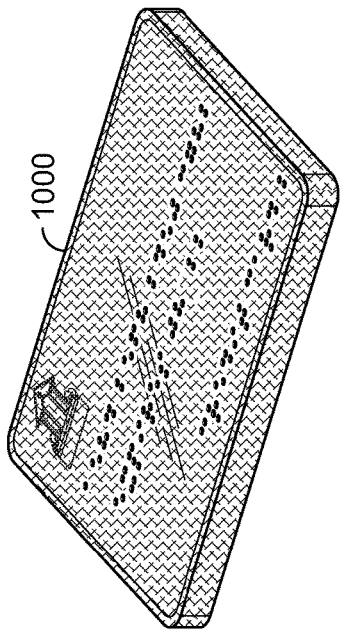

FIG. 10D shows that purchasing instrument 1000 may include a button geometry that produces tangible braille buttons. Braille buttons may allow visually impaired users to feel the keys and make appropriate selections to enter information.

Figure 10E:
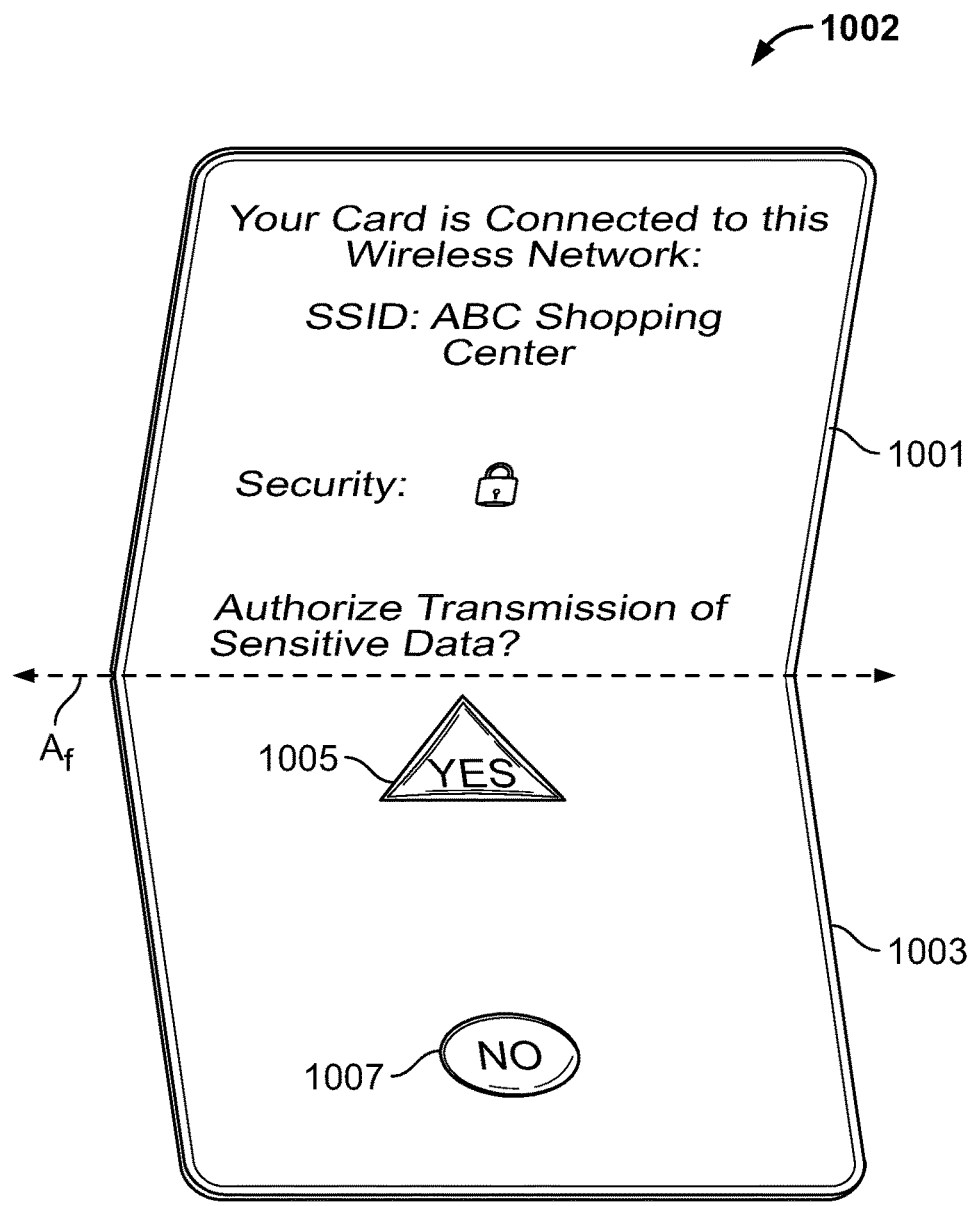

FIG. 10E shows illustrative purchasing instrument 1002. Purchasing instrument 1002 may include an OLED display. FIG. 10E shows illustrative information that may be presented using the OLED display. FIG. 10E also shows that purchasing instrument 1002 and its OLED display may be foldable about axis $A_f$. Axis $A_f$ may define section 1001 and section 1003 of purchasing instrument 1002. Section 1001 may include OLED displays on a front-face, back-face and/or thickness of section 1001. Section 1003 may include OLED displays on a front-face, back-face and/or thickness of section 1003.

Purchasing instrument 1002 and its OLED display may also be rollable. Purchasing instrument 1002 may be foldable such that when folded about axis $A_f$, purchasing instrument 1002 is 85.60 mm×53.98 mm×0.8 mm.

FIG. 10E also shows that an OLED display may be configured to form a textured or tangible surface. FIG. 10E shows that tangible buttons 1005 and 1007 that each have different shapes. The different shapes may allow visually impaired user to tactilely and visually differentiate between different selection options.

FIG. 11 shows illustrative scenario 1100. Scenario 1100 shows user 1101 using purchasing instrument 1103 to make a purchase at wireless beacon 1105. Scenario 1100 shows user 1107 using purchasing instrument 1109 to make a purchase at wireless beacon 1111. Wireless beacon 1111 may be a POS terminal. Scenario 1100 also shows user 1113 using purchasing instrument 1105 to make a purchase at wireless beacon 1117.

Scenario 1100 shows multiple users (1101, 1107 and 1113) using purchasing instruments (1103, 1109 and 1105) to make a purchase at wireless beacons (1105, 1111 and 1117). FIG. 11 shows that purchasing instruments may be configured to communicate wirelessly with wireless beacons within a transmission range that does not interfere with purchasing instruments of other users. Each of the purchasing instruments may transfer a light pattern created by each user to the specific wireless beacon being accessed by the user.

For example, purchasing instrument 1105 may transfer a light pattern to wireless beacon 1117. In response to receiving the light pattern, wireless beacon 1117 may present information to user 1113 that is formatting in accordance with the light pattern received from purchasing instrument 1105.

In some embodiments, a purchasing instrument may be configured to auto-sense the presence of other purchasing instruments or wireless beacons. In response to detecting another purchasing instrument, a purchasing instrument may be configured to utilize a wireless communication protocol that minimizes a risk of interference with the detected purchasing instrument. For example, in response to detecting other purchasing instruments, the purchasing instrument may only communicate and/or receive sensitive data using a NFC communication protocol.

A typically NFC communication protocol may a typical range of less than ~2 in. Illustrative protocols for NFC are provided by the NFC Forum at www.nfcforum.org. A purchasing instrument may be configured to dynamically limit or expand transmitting and receiving ranges.

FIG. 12 shows illustrative purchasing instrument 1200. Purchasing instrument 1200 is shown displaying quick response "QR" code 1203. QR code 1203 may include sensitive data. For example, QR code 1203 may include a credit card number, user name or expiration date. QR code 1203 may be read by a scanner associated with a wireless beacon. The wireless beacon may process a transaction based on reading the sensitive data encoded within QR code 1203. Displaying sensitive data in a QR code format may mitigate a risk of exposure of sensitive data stored on purchasing instrument 1200. Mitigating a risk of exposure may be especially important for visually impaired users who may not be able to ascertain whether their surroundings are secure.

QR code 1203 may be presented on purchasing instrument 1200 using OLED display 1201. FIG. 12 shows that OLED display 1201 covers an entire surface area of a face of purchasing instrument 1200. In some embodiments, purchasing instrument 1200 may include a second OLED display on an opposing face and/or along a thickness of purchasing instrument 1200.

FIG. 12 also shows illustrative contacts 1202 and 1204. One or more of contacts 1202 and 1204 may be utilized to transfer power to purchasing instrument 1200. For example, one or more of contacts 1202 and 1204 may contact a power source when purchasing instrument 1200 is swiped at a POS terminal or inserted into an ATM. One or more of contacts 1202 and 1204 may be utilized to transfer information (e.g., sensitive date, location information, light pattern) to/from a wireless beacon.

Contacts 1202 and 1204 may connect to one or more other components of an illustrative purchasing instrument. For example, contacts 1202 and 1204 may transfer power/information to circuitry layer 205 (shown in FIG. 2), battery layer 105 (shown in FIG. 1), software chip 109 (shown in FIG. 1), communication circuit 111 (shown in FIG. 1) or any suitable component of an illustrative purchasing instrument described herein.

Some embodiments (not shown) may include an EMV chip (not shown). EMV is a technology that derives its name from the companies (Europay, MasterCard, and Visa) that helped develop the technology. The EMV chip may function as a contact.

A contact may be accessible through an OLED display on a face of a purchasing instrument. In some embodiments, the contact may be positioned underneath an OLED display on a face of the purchasing instrument. In such embodiments, the contact may be accessible via induction or other contactless methods of electronically transferring data and/or power.

In some embodiments, a wireless beacon may be associated with high risk of electronic eavesdropping. For example, a threshold number of purchasing instruments that have been used to access the wireless beacon may have later been associated with an instance of fraud (e.g., compromised sensitive data). As a preventive measure, the wireless beacon may program any purchasing instrument that attempts to access it to display a visual warning that the wireless beacon is not secure.

As a further example, the wireless beacon may program any purchasing instrument that attempts to access it to be inserted into a card reader of the beacon. The wireless beacon may communicate such instructions by triggering a visual indicator or text-based message on an OLED display of the purchasing instrument.

FIG. 13 shows illustrative purchasing instrument 1300. Purchasing instrument 1300 includes an OLED display on face 1301. Face 1301 may be a front-face or a back-face of purchasing instrument 1300. Purchasing instrument 1300 includes an OLED display on side 1305. Purchasing instrument 1300 also includes an OLED display on side 1303. Purchasing instrument 1300 may also include OLED displays on sides 1307 and 1309. FIG. 13 shows each of the OLED displays on sides 1305 and 1303 being illuminated.

Each of the OLED displays on purchasing instrument 1300 may be illuminated and controlled independently of each other. For example, FIG. 13 shows the OLED display on side 1305 being illuminated and the OLED display on face 1301 displaying text. A user of the purchasing instrument may design a light pattern that utilizes one or more the OLED displays on any of the faces and/or sides of a purchasing instrument.

FIGS. 14A-14E show illustrative visual ques and indicators that may be programmed by a user and presented by an OLED display of a purchasing instrument.

Figure 14A:
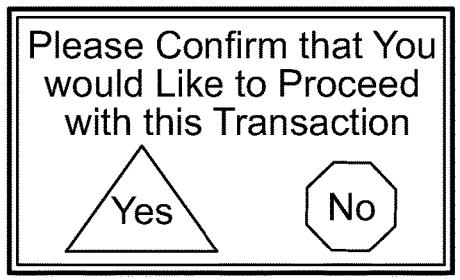
FIGS. 14A-14E show illustrative apparatus in accordance with principles of the invention.

FIG. 14A shows that a purchasing instrument may present indicators having different shapes.

Figure 14B:

FIG. 14B shows that a purchasing instrument may present visual indicator if a transaction requested by a user is for an amount above a threshold amount. The threshold amount that triggers the visual indicator may be determined based on the user's transaction history, may be set by the user or may be a system-set default amount.

Figure 14C:
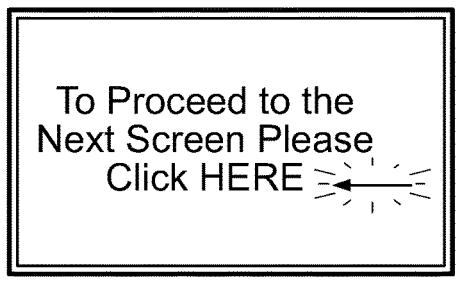

FIG. 14C shows that a purchasing instrument may display a visual indicator that helps a user navigate through a workflow. A visual arrow indicator may be more discernable to a visually impaired user than the text "HERE."

Figure 14D:

FIG. 14D shows that text presented on an OLED display of a purchasing instrument may be enlarged. In embodiments that include a touch sensitive OLED display, a user may provide touch based input to expand or shift the displayed text. For example, a user may pinch-to-zoom or swipe to drag text.

Figure 14E:
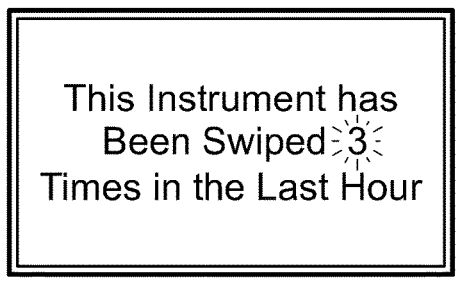

FIG. 14E shows an illustrative security warning that may be displayed. At certain venues, such as restaurants, a purchasing instrument may be taken from a user by a server, swiped at the restaurant's POS terminal, and then returned to the user. While the purchasing instrument is not in possession of the user, there is a risk that sensitive data associated with the purchasing instrument may be surreptitiously copied. For example, an unscrupulous server may swipe the purchasing instrument or otherwise copy a credit card number in addition to swiping the purchasing instrument through the restaurant's POS terminal.

FIG. 14E shows that a purchasing instrument may be configured to track and register such swipes or copying of sensitive data. The purchasing instrument may visually inform the user whether the purchasing instrument has been swiped more than a threshold number of times within a pre-determined time window. Such a visual alert may put the user on notice of a risk that the sensitive data associated with the card may have been compromised.

Other illustrative light patterns may include programming the OLED display to flash in a pre-determined sequence. The pre-determined sequence may include colors, patterns, illuminated/dark pixel location, length-of-time pixels remain illuminated or any other suitable characteristics.

Figure 15:
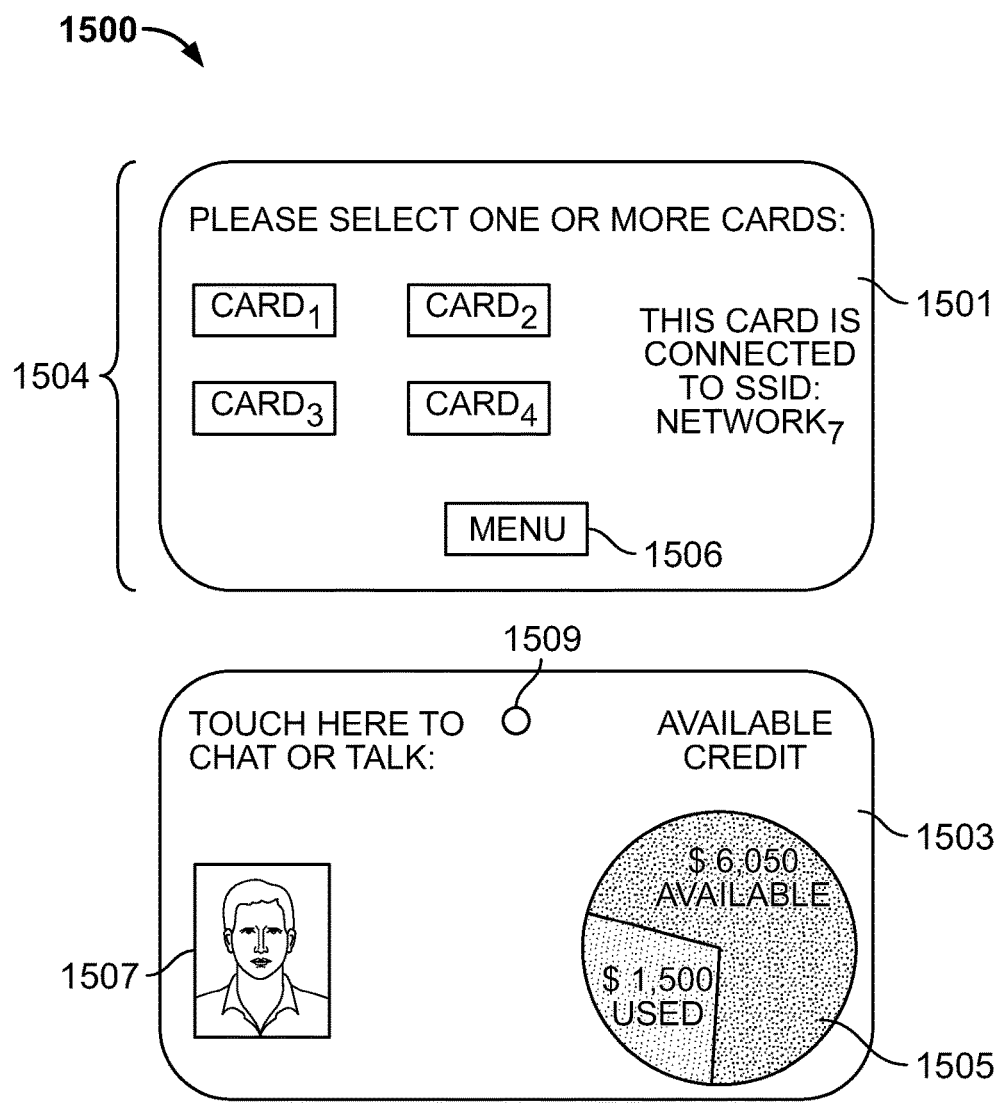
FIG. 15 shows illustrative apparatus in accordance with principles of the invention.

FIG. 15 shows illustrative purchasing instrument 1500. Purchasing instrument 1500 may include one or more features of circuit board 100 (shown in FIG. 1). Information may be stored on purchasing instrument 1500 and may be displayed using OLED layer 101 (shown in FIG. 1). The information may include sensitive data. Purchasing instrument 1500 includes front-face 1501 and back-face 1503. FIG. 15 shows illustrative information that may be displayed on purchasing instrument 1500. Purchasing instrument 1500 may utilize OLED display technology to present the information. Purchasing instrument 1500 may include at least two OLED displays. For example, purchasing instrument 1500 may include a first OLED layer as shown in FIG. 4 and a second OLED layer as shown in FIG. 9.

FIG. 15 shows that front-face 1501 may display an identity of a network that is in communication with purchasing instrument 1500. Purchasing instrument 1500 is shown displaying that it is connect to a network having a service set identifier "Network 7."

FIG. 15 shows that front-face 1501 may display a representation of instances of sensitive data associated stored on purchasing instrument 1500. A user of purchasing instrument 1500 may touch one or more of the representations to select sensitive data that may be transmitted by purchasing instrument 1500. In embodiments that include a touch screen, the user may touch one or more of the displayed representations to make a selection.

Purchasing instrument 1500 is shown displaying representations 1504 of sensitive data associated with a credit card, a traveler's check and a gift card that are stored on purchasing instrument 1500. A user of purchasing instrument 1500 may select one or more of representations 1504 to complete a purchase or transaction. In response to selecting one or more of representations 1504, the sensitive data associated with the user selection may be transmitted by purchasing instrument 1500.

FIG. 15 also shows that front-face 1501 may provide access to menu option 1506. The menu option 1506 may provide access to settings associated with purchasing instrument 1500. Illustrative settings may include requiring all information to be displayed in graphical form or be of a certain font size, changing a user name/password, updating biometric information, adjusting power settings, turning on/off wireless communication or any suitable setting.

FIG. 15 also shows information displayed on back-face 1503 of purchasing instrument 1500. Back-face 1503 may also utilize OLED display technology to present information to the user.

Back-face 1503 is shown displaying value information 1505. Purchasing instrument 1500 may store a value. For example, the value may be a value of a gift card or traveler's check. In some embodiments, the value may be changed. For example, a user may replenish a value associated with a traveler's check or gift card.

A user may also remove the value from purchasing instrument 1500. A wireless beacon may instruct purchasing instrument 1500 to delete sensitive data stored on purchasing instrument 1500. For example, in response to detecting a security breach associated with purchasing instrument 1500 (or sensitive data stored thereon), the value may be deleted or reduced to zero. A change in the value may be pushed to purchasing instrument 1500 over a network.

FIG. 15 shows value information 1505. Value information 1505 shows how much of the value has been used. A user of purchasing instrument 1500 may be required to provide a biometric feature or other credentials before purchasing instrument 1500 presents value information 1505.

Value information 1505 may be color coded. For example, a visually impaired user may have difficult reading the numbers associated with value information 1505. Value information 1505 may display the amount used in a first color and the amount available in a second color. The colors may be selected to be visible to users that have a color vision impairment (e.g., a decreased ability to see specific colors or differences in color).

Purchasing instrument 1500 is also shown displaying video 1507. Purchasing instrument 1500 may also include a microphone (not shown) and/or a speaker (not shown). For users that are visually impaired, purchasing instrument 1500 may present video and/or audio instructions for completing a transaction. Purchasing instrument 1500 may present audio and/or video warnings (e.g., that a wireless beacon may not be trusted or safe to use).

Purchasing instrument 1500 may also include projector 1509. Projector 1509 may present information on a surface. Projector 1509 may present information onto the surface in a larger size than would have otherwise been presented on an OLED display of purchasing instrument 1500. The larger size presentation of information may be more easily discernable by visually impaired users.

In some embodiments, purchasing instrument 1500 may connect to a camera, microphone, speaker or other I/O device using a wired or wireless communication protocol. For example, purchasing instrument 1500 may connect to an I/O device using NFC communication or via a contact (such as contact 1202, shown in FIG. 12).

Information displayed on front-face 1501 may be displayed on back-face 1503. Information displayed on back-face 1503 may be displayed on front-face 1501.

Figure 16:
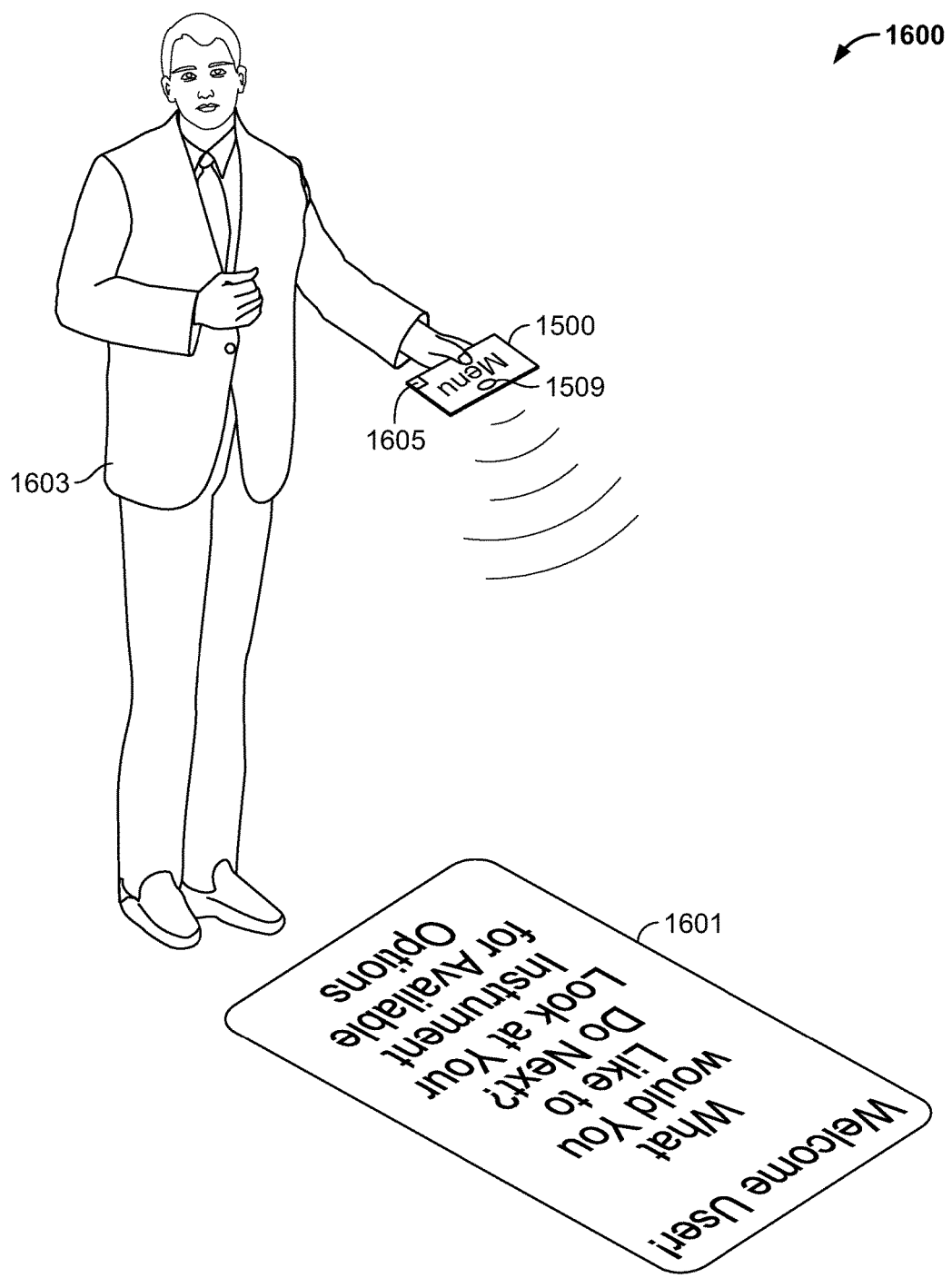
FIG. 16 shows an illustrative scenario and apparatus and in accordance with principles of the invention.

FIG. 16 shows scenario 1600. Scenario 1600 shows user 1603 utilizing projector 1509 on purchasing instrument 1500. Scenario 1600 shows projector 1509 presenting information 1601. Scenario 1600 also shows that purchasing instrument 1500 may be used as an input device to respond to prompts or ques presented within projected information 1601. Inputs presented on purchasing instrument 1500 may fill the entire display of purchasing instrument 1500 because other information is presented within projected information 1601. By filling the entire display, such inputs may be more visible to users with a visual impairment.

FIG. 16 also shows that purchasing instrument 1500 may include biometric sensor 1605. Biometric sensor 1605 may be positioned such that it is accessible when user 1603 holds purchasing instrument 1500. Biometric sensor 1305 may include a pressure sensitive actuator such as pressure sensitive button 107 (shown in FIG. 1A). Biometric sensor may be used to provide input or a response to a prompt displayed within projected information 1601.

Figure 17:
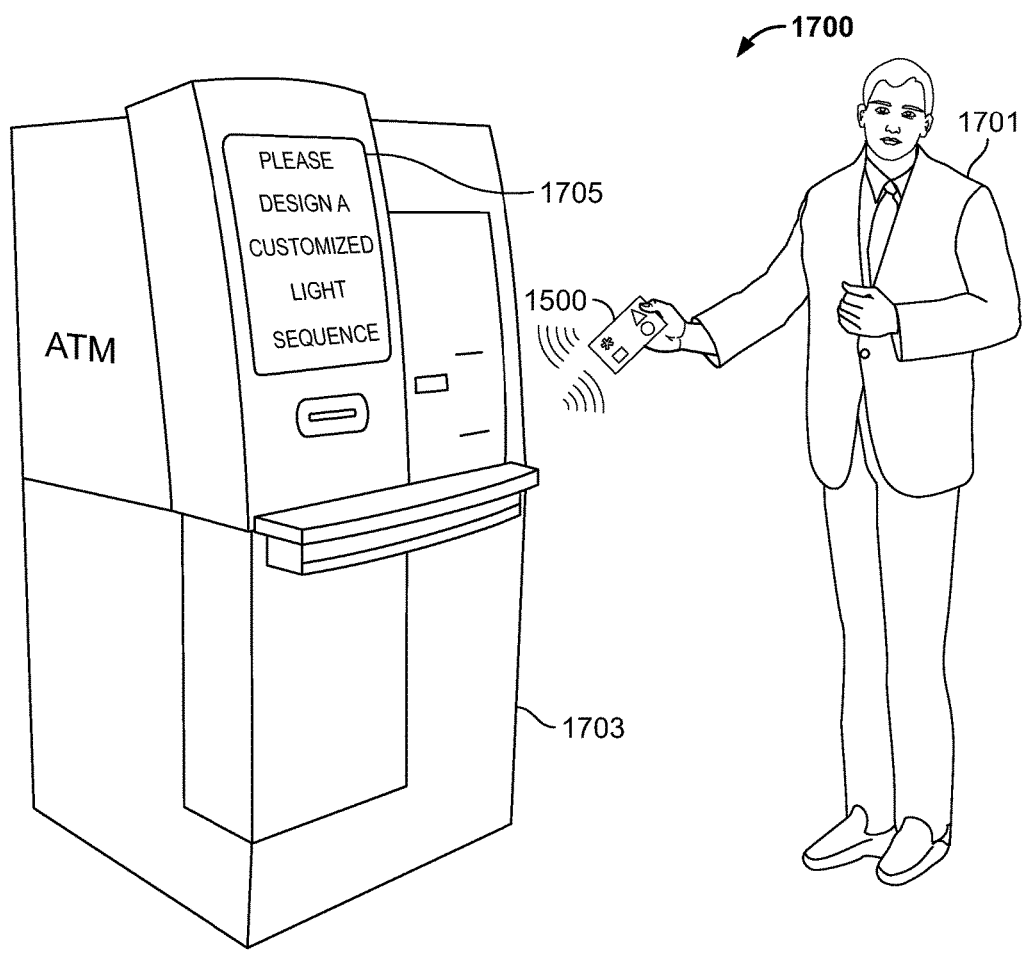
FIG. 17 shows an illustrative scenario and apparatus and in accordance with principles of the invention.

FIG. 17 shows illustrative scenario 1700. Scenario 1700 shows user 1701 using purchasing instrument 1500 (shown in FIG. 15) to communicate with wireless beacon 1703. Scenario 1700 shows that wireless beacon 1703 may prompt user 1701 to design a customized light sequence or pattern. User 1701 may design the light pattern by selecting options presented on a display of purchasing instrument 1500. In some embodiments, user 1701 may design the light pattern using one or more features of wireless beacon 1703.

The customized light pattern designed by user 1701 may be stored on purchasing instrument 1500. Whenever user 1701 uses purchasing instrument 1500 to access a wireless beacon (e.g., wireless beacon 1111 shown in FIG. 11), the wireless beacon may present information to user 1701 in conformance with the customized light pattern. Illustrative light patterns are shown above in FIGS. 14A-14E. The customized light pattern may provide user 1701 with a uniform experience across a plurality of devices and/or services accessed using purchasing instrument 1500.

Figure 18:
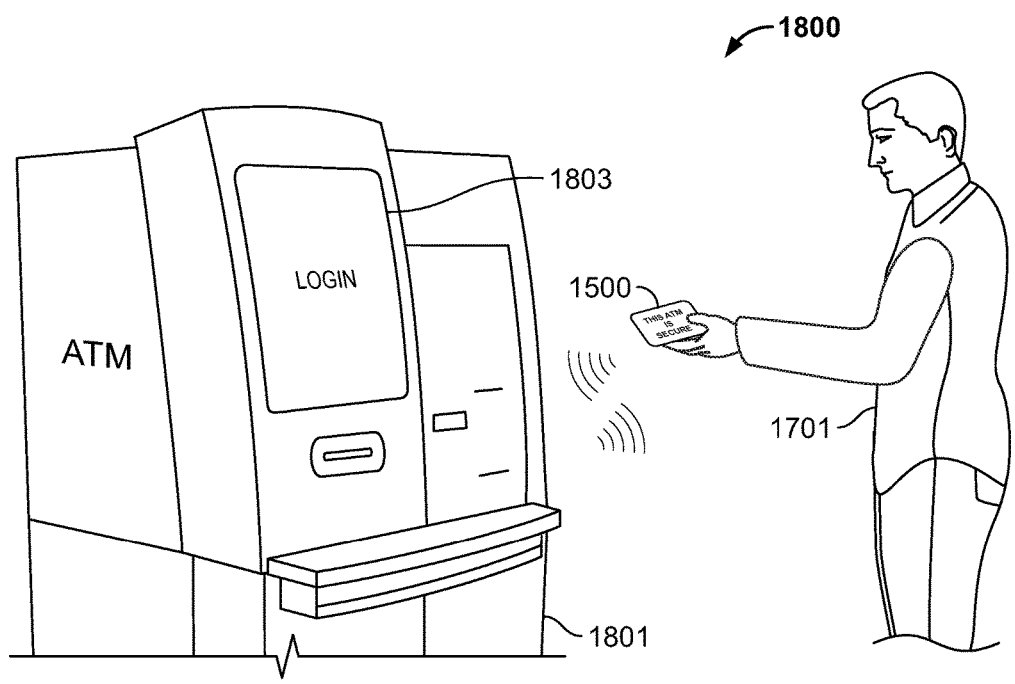
FIG. 18 shows an illustrative scenario and apparatus and in accordance with principles of the invention.

FIG. 18 shows illustrative scenario 1800. Scenario 1800 shows user 1701 using purchasing instrument 1500 to access wireless beacon 1801. Scenario 1800 shows that purchasing instrument 1500 may present a security indicator to user 1701. The security indicator may inform user 1701 whether it safe to use purchasing instrument 1500 to access wireless beacon 1801.

The security indicator may be presented before purchasing instrument 1500 transmits sensitive data to wireless beacon 1801 or before user 1701 enters sensitive data at wireless beacon 1801. In some embodiments, wireless beacon 1801 may transmit its security status to purchasing instrument 1500. In some embodiments, purchasing instrument 1500 may check a security status of wireless beacon 1801. For example, purchasing instrument 1500 may periodically connect to a network and download a list of known secure or trusted wireless beacons.

When attempting to access wireless beacon 1801, purchasing instrument 1500 may obtain a unique identifier associated with wireless beacon 1801 and determine if it is on the list of know safe beacons. In some embodiments, purchasing instrument 1500 may obtain the unique identifier and check in real-time whether wireless beacon 1801 is safe to use.

The security indicator presented on purchasing instrument 1500 may be a color, text or any suitable indicator. In some embodiments, the security indicator may be presented on display 1803 of wireless beacon 1801.

In some embodiments, wireless beacon 1801 may display a light pattern at "login" time. The light pattern may confirm a trusted status of wireless beacon 1801. A message also may be sent to purchasing instrument 1500 or another mobile device of user 1701 confirming that wireless beacon 1801 (now being accessed) is a trusted device.

If user 1701 does see the light pattern or receive confirmation that wireless beacon 1801 is a trusted device, user 1701 may report the absence of the light pattern. User 1701 may submit such a report using purchasing instrument 1500 or using another mobile device.

Figure 19:
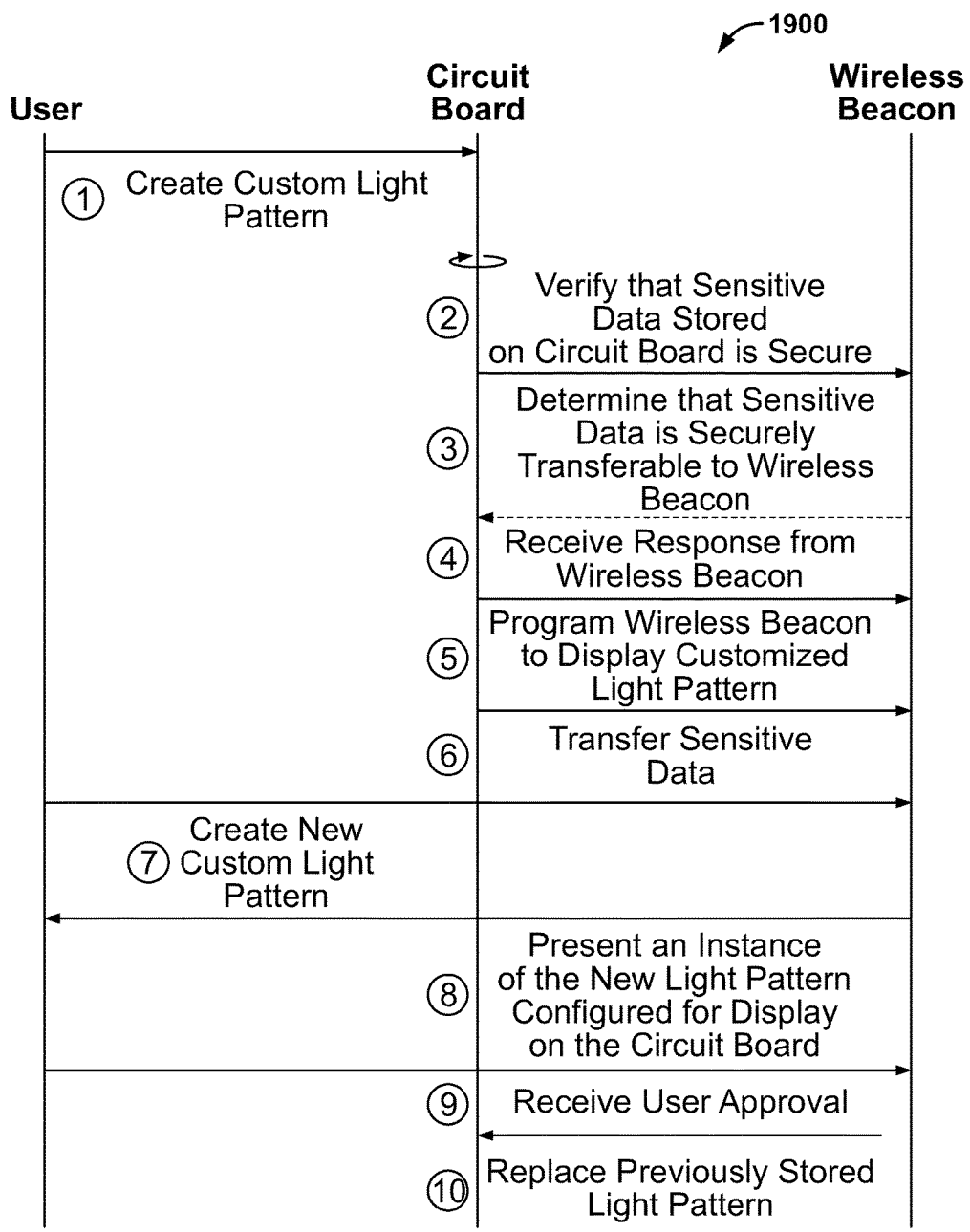
FIG. 19 shows an illustrative process in accordance with principles of the invention.

FIG. 19 shows illustrative transmission flow 1900. Transmission flow 1900 begins at step 1. At step 1, a user creates a custom light pattern. The custom light pattern may be created by a user using any suitable apparatus such as the user's personal computer, a purchasing instrument or a wireless beacon.

At step 2, the circuit board verifies that sensitive data stored thereon is secure. Such verification may include determining whether a fraud alert has been associated with the sensitive data. At step 3, the circuit board determines whether the sensitive data is securely transferable to a wireless beacon. Such a determination may be based on whether the wireless beacon is a trusted device or whether the wireless beacon has been associated with a security breach.

At step 4, the circuit board receives a response from the wireless beacon. Step 4 is shown in broken line because, in some embodiments, step 4 may be optional. In some embodiments, the circuit board itself may determine whether the wireless beacon is secure.

At step 5, the circuit board programs the wireless beacon to display the customized light pattern created by the user. In response to being presented with the light pattern, at step 6, the user may initiate a transfer of sensitive data from the circuit board to the wireless beacon. Step 6 may also include the user conducting one or more transactions using the wireless beacon and customized light pattern.

At step 7, the user may create a new light pattern using the wireless beacon. At step 8, the wireless beacon may present the new light pattern to the user. The wireless beacon may present the new light pattern as it would be presented by a purchasing instrument that includes the circuit board (such as illustrative purchasing instrument 1500, shown in FIG. 15).

At step 9, the wireless beacon may receive user approval of the new light pattern. At step 10, the new light pattern replaces the light pattern previously stored on the circuit board. In some embodiments, the new light pattern may be associated with a specific workflow. In such embodiments, a previously stored light pattern may be associated with a different workflow and may not be replaced by the new light pattern.

Thus, methods and apparatus for an OLED visual authentication circuit board have been provided. Persons skilled in the art will appreciate that the present invention can be practiced by other than the described embodiments, which are presented for purposes of illustration rather than of limitation. The present invention is limited only by the claims that follow.

What is claimed is:
1. A circuit board comprising:
 a programmable array of organic light emitting diodes ("OLEDs") forming an OLED display, the array of

OLEDs having a thickness that is not greater than 0.25 mm and having a surface area that is at least 90% of 85.60 mm×53.98 mm;

a communication circuit having a thickness that is not greater than 0.8 mm;

a processor circuit comprising a non-transitory memory and a processor, the processor circuit having a thickness that is not greater than 0.25 mm;

a reservoir holding fluid;

a plastic panel configured to be dynamically altered by movement of the fluid in/out of the reservoir; and a power source for powering the OLED display, the communication circuit, the processor circuit and moving the fluid in/out of the reservoir, the power source having a thickness that is not greater than 0.5 mm;

wherein the processor circuit is configured to:

receive programming instructions from a user of the circuit board, the programming instructions comprising a button geometry configured to present a textured surface on the plastic panel in response to initiation, by the user, of a pre-determined workflow;

store the button geometry in the non-transitory memory;

in response to initiation of the pre-determined workflow on the circuit board, execute the programming instructions to form the textured surface in accordance with the button geometry;

receive a message from the communication circuit that the circuit board is within a pre-determined distance of a wireless beacon; and in response to receiving the message, instruct the communication circuit to transmit instructions that dynamically program the wireless beacon such that, in response to initiation of the pre-determined workflow at the wireless beacon, the wireless beacon presents information to the user in accordance with the button geometry.

2. The circuit board of claim 1 wherein a surface of the plastic panel is configured to be dynamically altered by fluid stored in the reservoir.

3. The circuit board of claim 1 wherein the plastic panel comprises:

a first state in which the surface is smooth; and a second state in which the surface comprises the textured surface.

4. The circuit board of claim 1 wherein the plastic panel comprises a touch-sensitive surface.

5. The circuit board of claim 1 wherein the OLED display is visible through the plastic panel and is configured to present a visual indicator associated with the textured surface.

6. The circuit board of claim 1 wherein the textured surface comprises:

a first button having a first shape; and a second button having a second shape.

7. The circuit board of claim 1, wherein the textured surface comprises one or more braille letters.

8. The circuit board of claim 1, wherein the button geometry comprises executable instructions that, when executed by the processor circuit, present an approval indicator in a first shape and a rejection indicator in a second shape.

9. The circuit board of claim 1, wherein in response to transmitting the button geometry to the wireless beacon:

the communication is configured to receive, from the wireless beacon, a security indicator comprising a recommendation whether the user should access the wireless beacon; and the processor circuit is configured to present the security indicator on the plastic panel such that the security indicator conforms to the button geometry.

10. The circuit board of claim 9 wherein, the security indicator is presented on the plastic panel:

before the circuit board transmits sensitive data to the wireless beacon; or before the user enters sensitive data at the wireless beacon.

11. The circuit board of claim 1, wherein, the wireless beacon is dynamically programmed to scale-up a font size associated with the button geometry based on one or more properties of a screen hardwired to the wireless beacon.

12. A circuit board comprising:

an array of organic light emitting diodes ("OLEDs") forming a foldable OLED display;

a communication circuit having a thickness that is not greater than 0.8 mm;

a processor circuit comprising a non-transitory memory and a processor, the processor circuit having a thickness that is not greater than 0.25 mm;

a plastic panel that:

in a first state, comprises a surface that is smooth; and in a second state, comprises one or more tangible buttons that protrude from the surface; and a power source for illuminating the OLED display, operating the communication circuit, transforming the surface of the plastic panel from the first state into the second sate and operating the processor circuit, the power source having a thickness that is not greater than 0.5 mm;

wherein the processor circuit is configured, by executed machine readable instructions stored in the non-transitory memory to:

receive a message from the communication circuit that the circuit board is within a pre-determined distance of a wireless beacon;

determine whether sensitive data associated with the circuit board is securely transferrable to the wireless beacon; and in response to verifying that the sensitive data associated with the circuit board is securely transferrable to the wireless beacon, transform the plastic panel from the first state into the second state.

13. The circuit board of claim 12 wherein:

the foldable OLED display comprises a folded state and an unfolded state; and in the folded state, the circuit board measures 85.60 mm×53.98 mm×0.8 mm.

14. The circuit board of claim 12, wherein the processor circuit is configured to determine whether the sensitive data associated with the circuit board is securely transferrable to the wireless beacon based on whether a location of the wireless beacon has been associated with a fraud alert or a data breach.

15. The circuit board of claim 12 wherein in response to the processor circuit determining that the sensitive data associated with the circuit board is not securely transferrable to the wireless beacon, the foldable OLED display presents a flashing visual warning that the wireless beacon is not secure.

16. The circuit board of claim 12 wherein in the second state, the processor circuit is configured to instruct the foldable OLED display to present:

a first approval indicator for a first transaction value in a first shape and in a first color; and a second approval indicator for a second transaction value in a second shape and in a second color;

wherein the second transaction value is at least double the first transaction value.

17. The circuit board of claim 12, wherein the wireless beacon presents information generated by the wireless beacon by instructing the processor circuit to present the information by transforming the plastic panel into the second state.

18. The circuit board of claim 12 wherein the processor circuit configures the foldable OLED display to present a visual indicator aligned with each of the one or more tangible buttons that protrude from the surface of the plastic panel.

19. A circuit board comprising:
  an array of organic light emitting diodes ("OLEDs") forming a foldable OLED display;
  a communication circuit having a thickness that is not greater than 0.8 mm;
  a processor circuit comprising a non-transitory memory and a processor, the processor circuit having a thickness that is not greater than 0.25 mm;
  a plastic panel that:
    in a first state, comprises a surface that is smooth; and
    in a second state, comprises one or more tangible buttons that protrude from the surface; and
  a power source for illuminating the OLED display, operating the communication circuit, transforming the plastic panel from the first state to the second state and operating the processor circuit, the power source having a thickness that is not greater than 0.5 mm;
wherein, in operation, the processor circuit is configured to:
  receive a button geometry:
    associated with the one or more tangible buttons; and
    programmed by a user of the circuit board;
  store the button geometry in the non-transitory memory;
  in the second state, configure the OLED display to illuminate such that information presented on the OLED display is aligned with the one or more tangible buttons;
  receive a message from the communication circuit that the circuit board is within a pre-determined distance of a wireless beacon; and
  in response to receiving the message, transfer the button geometry to the wireless beacon and dynamically program the wireless beacon such that in response to initiation of a pre-determined workflow at the wireless beacon, the wireless beacon presents information to the user in conformance with the button geometry.

20. The circuit board of claim 19 wherein the button geometry comprises machine readable instructions that, when executed by the processor circuit, present an approval indicator in a first shape and a rejection indicator in a second shape.

* * * * *